(12) United States Patent
Sakai et al.

(10) Patent No.: US 11,932,781 B2
(45) Date of Patent: Mar. 19, 2024

(54) EFFECT PIGMENT DISPERSION AND METHOD FOR FORMING MULTILAYER COATING FILM

(71) Applicant: KANSAI PAINT CO., LTD., Hyogo (JP)

(72) Inventors: Kenji Sakai, Kanagawa (JP); Nobuhiko Narita, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 477 days.

(21) Appl. No.: 17/278,428

(22) PCT Filed: Sep. 24, 2019

(86) PCT No.: PCT/JP2019/037193
§ 371 (c)(1),
(2) Date: Mar. 22, 2021

(87) PCT Pub. No.: WO2020/066980
PCT Pub. Date: Apr. 2, 2020

(65) Prior Publication Data
US 2021/0348004 A1    Nov. 11, 2021

(30) Foreign Application Priority Data

Sep. 25, 2018  (JP) ................. 2018-178675
Oct. 31, 2018  (JP) ................. 2018-205759

(51) Int. Cl.
| | |
|---|---|
| C09D 5/36 | (2006.01) |
| B05D 5/06 | (2006.01) |
| B05D 7/00 | (2006.01) |
| C09D 5/00 | (2006.01) |
| C09D 7/40 | (2018.01) |
| C09D 7/65 | (2018.01) |
| C09D 17/00 | (2006.01) |
| C09D 133/06 | (2006.01) |

(52) U.S. Cl.
CPC ............... *C09D 5/36* (2013.01); *B05D 5/06* (2013.01); *B05D 7/57* (2013.01); *C09D 5/002* (2013.01); *C09D 7/65* (2018.01); *C09D 7/70* (2018.01); *C09D 17/001* (2013.01); *C09D 133/066* (2013.01)

(58) Field of Classification Search
None
See application file for complete search history.

(56) References Cited

U.S. PATENT DOCUMENTS

| | | |
|---|---|---|
| 10,898,923 B2 | 1/2021 | Itoh et al. |
| 2020/0238333 A1 | 7/2020 | Itoh et al. |

FOREIGN PATENT DOCUMENTS

| | | |
|---|---|---|
| EP | 3 542 910 | 9/2019 |
| JP | 63-272544 | 11/1988 |
| JP | 2006-95522 | 4/2006 |
| JP | 2009-155537 | 7/2009 |
| JP | 2011-195660 | 10/2011 |
| JP | 2011-202010 | 10/2011 |
| WO | 2017/175468 | 10/2017 |
| WO | WO 2017/175468 | * 10/2017 |
| WO | 2018/092874 | 5/2018 |

OTHER PUBLICATIONS

International Search Report dated Nov. 12, 2019 in International (PCT) Application No. PCT/JP2019/037193.

* cited by examiner

*Primary Examiner* — Sheeba Ahmed
(74) *Attorney, Agent, or Firm* — Wenderoth, Lind & Ponack, L.L.P.

(57) ABSTRACT

The present invention provides an effect pigment dispersion that contains water, a wetting agent (A), a flake-effect pigment (B), and specific cellulose nanofibers (C). The effect pigment dispersion has a solids content of 0.1 to 10 parts by mass, per 100 parts by mass of all of the components of the effect pigment dispersion; and has a viscosity of 100 to 10000 mPa·sec as measured with a Brookfield viscometer at a rotational speed of 6 revolutions per minute.

10 Claims, No Drawings

EFFECT PIGMENT DISPERSION AND METHOD FOR FORMING MULTILAYER COATING FILM

TECHNICAL FIELD

The present invention relates to an effect pigment dispersion, and a method for forming a multilayer coating film.

BACKGROUND ART

The main purpose of applying paint is to protect materials, and to impart an excellent appearance to materials. In industrial commodities, great value is placed on excellent appearance, in particular "texture," to enhance product appeal. Although the texture of the industrial commodities desired by consumers varies, metallic or pearlescent luster (metallic luster and pearlescent luster are collectively referred to as "metallic or pearly luster" below) has been in demand in fields such as automobile exterior panels, auto parts, and home appliances.

Metallic or pearly luster refers to a texture that has no surficial graininess, like the surface of a mirror; that shines brilliantly when viewed in a direction practically perpendicular to a coated plate (highlight); and that looks dark when viewed obliquely to the coated plate (bottom). In other words, there is a large difference in luminance between the highlight region and the bottom region of the texture.

Techniques to impart such metallic or pearly luster to the surface of industrial commodities include metal plating and metal deposition (e.g., PTL 1). However, paint that can impart metallic or pearly luster is advantageous, for example, in terms of simplicity and cost. If the paint is an aqueous paint, it is more advantageous from the viewpoint of burden on the environment.

PTL 2 discloses an aqueous base paint composition containing an effect pigment composed of metal flakes obtained by crushing a vapor deposition metal film and an aqueous cellulose derivative having an acid value of 20 to 150 mg KOH/g (solids content), wherein the aqueous cellulose derivative serves as a main binder resin, and the content of the effect pigment is 20 to 70 mass % as pigment weight concentration (PWC).

However, the coating film formed of the paint disclosed in PTL 2 is unsatisfactory in terms of metallic or pearly luster.

PTL 3 discloses a coating method of an aqueous base-coat paint that contains a flake-effect pigment; the coating method includes applying an aqueous base-coat paint (A1) adjusted to have a solids content of 20 to 40 wt % in the paint to a substrate, so as to have a thickness of 1 to 15 μm on a dry film basis; and applying an aqueous base-coat paint (A2) adjusted to have a solids content of 2 to 15 wt % in the paint to the uncured coating film, so as to have a thickness of 0.1 to 5 μm on a dry film basis.

However, the coating film formed by the coating method of PTL 3 is unsatisfactory in terms of metallic or pearly luster.

PTL 4 discloses an effect pigment dispersion that contains water, a flake-aluminum pigment, and a cellulose-based rheology control agent, wherein the effect pigment dispersion contains 0.1 to 10 parts by mass of solids per 100 parts by mass of all components thereof, the viscosity as measured with a Brookfield viscometer is 400 to 10000 mPa·sec at a rotational speed of 6 revolutions per minute, and the solids content of the flake-aluminum pigment is 30 to 200 parts by mass per 100 parts by mass of the total amount of components except for the flake-aluminum pigment in the total solids content.

The effect pigment dispersion disclosed in PTL 4 has excellent metallic luster. However, there has been further demand for an effect pigment dispersion that can provide excellent metallic luster, even after such an effect pigment dispersion is stored for a predetermined period of time and then applied to form a coating film ("stability" below). There has also been demand for further improved water resistance.

CITATION LIST

Patent Literature

PTL 1: JPS63-272544A
PTL 2: JP2009-155537A
PTL 3: JP2006-95522A
PTL 4: WO2017/175468A

SUMMARY OF INVENTION

Technical Problem

An object of the present invention is to provide an effect pigment dispersion that exhibits excellent water resistance, that can form metallic or pearly luster, and that further exhibits excellent stability; and to provide a method for forming a multilayer coating film.

Solution to Problem

A first embodiment of the present invention provides an effect pigment dispersion comprising
  water,
  a wetting agent (A),
  a flake-effect pigment (B), and
  cellulose nanofibers (C),
  the cellulose nanofibers (C) having a carboxyl group amount of 0.4 to 1.0 mmol/g based on the absolute dry mass of the cellulose nanofibers and having a transparency of 80% or more in a 1.0 mass % aqueous dispersion of the cellulose nanofibers,
  the effect pigment dispersion having a solids content of 0.1 to 10 parts by mass, per 100 parts by mass of all of the components of the effect pigment dispersion,
  the effect pigment dispersion having a viscosity of 100 to 10000 mPa·sec as measured with a Brookfield viscometer at a rotational speed of 6 revolutions per minute.

In one embodiment, the wetting agent (A) is present, on a solids basis, in an amount of 4 to 400 parts by mass, per 100 parts by mass of the solids content of the flake-effect pigment (B).

In another embodiment, the flake-effect pigment (B) is present, on a solids basis, in an amount of 2 to 97 parts by mass, per 100 parts by mass of the solids content of the effect pigment dispersion.

In another embodiment, the effect pigment dispersion further comprises an aqueous resin dispersion.

A second embodiment of the present invention provides a method for forming a multilayer coating film, comprising
  applying a colored paint to a substrate to form a colored coating film,
  applying the effect pigment dispersion of any one of the above to the formed colored coating film to form an effect coating film, and applying a clear paint to the formed effect coating film to form a clear coating film.

In one embodiment, in the method for forming a multilayer coating film, the effect coating film has a thickness of 0.1 to 4 µm on a dry film basis.

In another embodiment, in the method for forming a multilayer coating film, the multilayer coating film has a 60-degree specular gloss of 90 to 240.

A third embodiment of the present invention provides a multilayer coating film comprising
  a colored coating film formed from a colored paint,
  an effect coating film that is formed from the effect pigment dispersion of any one of the above and that is formed on the colored coating film, and
  a clear coating film that is formed from a clear paint and that is formed on the effect coating film.

In one embodiment, in the multilayer coating film, the effect coating film has a thickness of 0.1 to 4 µm on a dry film basis.

In another embodiment, the multilayer coating film has a 60-degree specular gloss of 90 to 240.

Advantageous Effects of Invention

The present invention provides an effect pigment dispersion that exhibits excellent water resistance, that can form metallic or pearly luster, and that further exhibits excellent stability; and a method for forming a multilayer coating film.

DESCRIPTION OF EMBODIMENTS

The present invention relates to an effect pigment dispersion comprising water, a wetting agent (A), a flake-effect pigment (B), and cellulose nanofibers (C); the cellulose nanofibers (C) having a carboxyl group amount of 0.4 to 1.0 mmol/g based on the absolute dry mass of the cellulose nanofibers and having a transparency of 80% or more in a 1.0 mass % aqueous dispersion of the cellulose nanofibers, and the effect pigment dispersion having a solids content within a specific range and a viscosity within a specific range. The present invention also relates to a method for forming a multilayer coating film, comprising applying the effect pigment dispersion to a colored coating film formed from a colored paint to form an effect coating film, and applying a clear paint to the effect coating film. The present invention further relates to a multilayer coating film comprising the effect coating film. First, the effect pigment dispersion is described in detail.

Effect Pigment Dispersion

The effect pigment dispersion according to one embodiment of the present invention comprises water, a wetting agent (A), a flake-effect pigment (B), and cellulose nanofibers (C); the cellulose nanofibers (C) have a carboxyl group amount of 0.4 to 1.0 mmol/g based on the absolute dry mass of the cellulose nanofibers and have a transparency of 80% or more in a 1.0 mass % aqueous dispersion of the cellulose nanofibers; the effect pigment dispersion has a solids content of 0.1 to 10 parts by mass, preferably 0.5 to 8 parts by mass, and more preferably 2 to 6 parts by mass, per 100 parts by mass of all of the components of the effect pigment dispersion; and the effect pigment dispersion has a viscosity of 100 to 10000 mPa·sec, preferably 200 to 8000 mPa·sec, and more preferably 400 to 6000 mPa·sec, as measured with a Brookfield viscometer at a rotational speed of 6 revolutions per minute.

Wetting Agent (A)

The wetting agent (A) for use in the effect pigment dispersion can be any wetting agent that aids in uniformly orientating the effect pigment dispersion on a substrate, when the effect pigment dispersion is applied to the substrate.

Materials that have such an effect are also referred to as "dispersant," "wetter," "leveling agent," "surface-adjusting agent," "antifoaming agent," "surfactant," "super wetter," or the like, as well as wetting agent. The wetting agent (A) in the effect pigment dispersion includes a dispersant, a wetter, a leveling agent, a surface-adjusting agent, an antifoaming agent, a surfactant, and a super wetter.

Examples of the wetting agent (A) include a silicone-based wetting agent, an acrylic-based wetting agent, a vinyl-based wetting agent, a fluorine-based wetting agent, and an acetylene diol-based wetting agent. These wetting agents may be used singly, or in a combination of two or more.

From the standpoint of obtaining an effect pigment dispersion that exhibits excellent water resistance, that can form metallic or pearly luster, and that further exhibits higher stability; and a method for forming a multilayer coating film, the wetting agent (A) for use is preferably an acetylene diol-based wetting agent and/or a wetting agent having an ethylene oxide chain.

In particular, the wetting agent (A) is preferably an ethylene oxide adduct of acetylene diol.

Examples of commercial products of the wetting agent (A) include BYK series (produced by BYK-Chemie), Tego series (produced by Evonik), Glanol series and Polyflow series (produced by Kyoeisha Chemical Co., Ltd.), DISPARLON series (produced by Kusumoto Chemicals, Ltd.), and Surfynol series (produced by Evonik Industries AG).

Examples of silicone-based wetting agents include polydimethylsiloxane and modified silicone obtained by modifying polydimethylsiloxane. Examples of modified silicone include polyether-modified silicone, acrylic-modified silicone, and polyester-modified silicone.

The amount of the wetting agent (A) in the effect pigment dispersion is preferably 4 to 400 parts by mass, more preferably 5 to 100 parts by mass, and still more preferably 8 to 60 parts by mass, on a solids basis, per 100 parts by mass of the solids content of the flake-effect pigment (B), from the standpoint of the metallic or pearly luster of the obtained multilayer coating film.

From the standpoint of excellent metallic or pearly luster of the obtained multilayer coating film, the content of the wetting agent (A) in the effect pigment dispersion is preferably 0.01 to 20 parts by mass, more preferably 0.02 to 15 parts by mass, and still more preferably 0.05 to 10 parts by mass, on a solids basis, per 100 parts by mass of the solids content of the effect pigment dispersion.

Flake-Effect Figment (B)

Examples of the flake-effect pigment (B) in the effect pigment dispersion include vapor-deposition metal flake pigments, aluminum flake pigments, and light interference pigments. One or a combination of two or more of these pigments can be suitably selected for use, depending on the texture desired for the coating film. From the standpoint of obtaining a coating film excellent in metallic luster, vapor deposition metal flake pigments and aluminum flake pigments are preferable. From the standpoint of obtaining a coating film excellent in pearly luster, interference pigments are preferable.

The vapor deposition metal flake pigment is obtained by vapor-depositing a metal film on a base material, peeling the base material, and then grinding the vapor deposition metal film. Examples of the base material include films.

The material of the above metal is not particularly limited. Examples include aluminum, gold, silver, copper, brass, titanium, chromium, nickel, nickel chromium, and stainless steel. Of these, aluminum or chromium is particularly preferable, from the standpoint of, for example, availability and convenience in handling. In the present specification, a vapor deposition metal flake pigment obtained by vapor-depositing aluminum refers to a "vapor deposition aluminum flake pigment," and a vapor deposition metal flake pigment obtained by vapor-depositing chromium refers to a "vapor deposition chromium flake pigment."

The vapor deposition metal flake pigment for use may be a vapor deposition metal flake pigment formed from a single layer of a vapor deposition metal film, or a vapor deposition metal flake pigment formed from a multilayer composed of a vapor deposition metal film and additional other metal or metal oxide.

The vapor deposition aluminum flake pigment is preferably surface-treated with silica from the standpoint of, for example, obtaining a coating film excellent in storage stability and metallic luster.

Examples of commercial products that can be used as the vapor-deposition aluminum flake pigment include "Metalure" series (trade name, produced by Eckart), "Hydroshine WS" series (trade name, produced by Eckart), "Decomet" series (trade name, produced by Schlenk), and "Metasheen" series (trade name, produced by BASF).

Examples of commercial products that can be used as the vapor deposition chromium flake pigment include "Metalure Liquid Black" series (trade name, produced by Eckart).

The average thickness of the vapor deposition metal flake pigment is preferably 0.01 to 1.0 µm, and more preferably 0.015 to 0.1 µm.

The vapor deposition metal flake pigment has an average particle size (D50) of preferably 1 to 50 µm, and more preferably 5 to 20 µm.

"Average particle size" as used herein refers to the median size in a volume-weighted particle size distribution measured by laser diffraction scattering with a Microtrac MT3300 particle size distribution analyzer (trade name, produced by Nikkiso Co., Ltd.). "Thickness" as used herein is defined as the average value determined by measuring the thickness using image processing software while observing the cross-sectional surface of a coating film that contains the flake-effect pigment with a microscope, and calculating the average value of 100 or more particles.

If the average particle size exceeds the above upper limit value, graininess may occur in the multilayer coating film. If the average particle size is less than the lower limit value, the change in lightness from the highlight to the bottom is too small. The metallic luster is insufficient in both cases.

The aluminum flake pigment is typically produced by crushing and grinding aluminum using a grinding aid in a ball mill or attritor mill, in the presence of a grinding liquid medium. Grinding aids for use in the production step of the aluminum flake pigment include higher fatty acids, such as oleic acid, stearic acid, isostearic acid, lauric acid, palmitic acid, and myristic acid; as well as aliphatic amines, aliphatic amides, and aliphatic alcohols. Grinding liquid media for use include aliphatic hydrocarbons, such as a mineral spirit.

The aluminum flake pigment is broadly categorized into leafing-type aluminum flake pigments and non-leafing-type aluminum flake pigments, according to the type of grinding aid. From the standpoint of forming a dense metallic coating film that exhibits excellent water resistance, high gloss in highlight, and lower graininess, a non-leafing-type flake-aluminum pigment is preferably used in the effect pigment dispersion. The non-leafing-type flake-aluminum pigments for use may be those whose surface is not particularly treated; those whose surface is coated with a resin; those whose surface is treated with silica; or those whose surface is treated with phosphoric acid, molybdic acid, or a silane coupling agent. The non-leafing-type flake-aluminum pigment for use may be a non-leafing-type flake-aluminum pigment subjected to one or several of these surface treatments.

The aluminum flake pigment for use may be a colored aluminum pigment prepared by coating the surface of an aluminum flake pigment with a color pigment, and further coating it with a resin; or a colored aluminum pigment prepared by coating the surface of an aluminum flake pigment with a metal oxide such as iron oxide.

From the standpoint of forming a dense metallic film that exhibits high gloss in highlight, with lower graininess, the aluminum flake pigment for use preferably has an average particle size of 1 to 100 µm, more preferably 5 to 50 µm, and particularly preferably 7 to 30 µm. The aluminum flake pigment for use preferably has a thickness of 0.01 to 1.0 µm, and particularly preferably 0.02 to 0.5 µm.

From the standpoint of water resistance and stability, the flake-effect pigment (B) for use in the effect pigment dispersion is preferably a combination of the vapor deposition metal flake pigment and the aluminum flake pigment. In this case, the mass ratio of the vapor deposition metal flake pigment to the aluminum flake pigment (vapor deposition metal flake pigment/aluminum flake pigment) is suitably 9/1 to 1/9, and preferably 2/8 to 8/2.

Interference pigments refer to effect pigments prepared by coating the surface of a transparent or translucent flaky base material, such as mica, synthetic mica, glass, iron oxide, aluminum oxide, and various metal oxides, with a metal oxide that has a refractive index different from that of the base material. Examples of metal oxides include titanium oxide and iron oxide. Interference pigments can develop a variety of different interference colors depending on the difference of the thickness of the metal oxide.

The interference pigment is preferably an interference pigment prepared by coating a transparent or translucent base material with titanium oxide and/or iron oxide, and more preferably an interference pigment prepared by coating a transparent or translucent base material with titanium oxide.

In the present specification, the transparent base material refers to a base material through which at least 90% of visible light transmits. The translucent base material refers to a base material through which at least 10% to less than 90% of visible light transmits.

Specifically, examples of interference pigments include the following metal oxide-coated mica pigments, metal oxide-coated alumina flake pigments, metal oxide-coated glass flake pigments, and metal oxide-coated silica flake pigments.

Metal oxide-coated mica pigments contain natural mica or synthetic mica as a base material, and are pigments prepared by coating the surface of the base material with a metal oxide. Natural mica is a flaky base material obtained by pulverizing mica from ore. Synthetic mica is synthesized by heating an industrial material, such as $SiO_2$, $MgO$, $Al_2O_3$, $K_2SiF_5$, or $Na_2SiF_6$, to melt the material at a high temperature of about 1500° C.; and cooling the melt for crystallization. When compared with natural mica, synthetic mica contains a smaller amount of impurities, and has a more uniform size and thickness. Specific examples of synthetic mica base materials include fluorophlogopite ($KMg_3AlSi_3O_{10}F_2$), potassium tetrasilicon mica ($KMg_{2.5}AlSi_4O_{10}F_2$), sodium tetrasilicon mica ($NaMg_{2.5}AlSi_4O_{10}F_2$), Na taeniolite ($NaMg_2LiSi_4O_{10}F_2$), and LiNe taeniolite ($LiMg_2LiSi_4O_{10}F_2$).

Metal oxide-coated alumina flake pigments are pigments obtained by coating the surface of an alumina flake base material with a metal oxide. Alumina flakes refer to flaky (thin) aluminum oxides, which are clear and colorless. Alumina flakes do not necessarily consist of only aluminum oxide, and may contain other metal oxides.

Metal oxide-coated glass flake pigments are pigments obtained by coating the surface of a flaky glass base material with a metal oxide. The metal oxide-coated glass flake pigments have a smooth base material surface, which causes intense light reflection.

Metal oxide-coated silica flake pigments are pigments obtained by coating flaky silica, a base material having a smooth surface and a uniform thickness, with a metal oxide.

The interference pigment may be surface-treated in order to improve, for example, dispersibility, water resistance, chemical resistance, and weatherability.

From the standpoint of obtaining a coating film excellent in pearly luster, the interference pigment for use preferably has an average particle size of 5 to 30 μm, and particularly preferably 7 to 20 μm.

"Particle size" as used herein refers to the median size in a volume-weighted particle size distribution measured by laser diffraction scattering with a Microtrac MT3300 particle size distribution analyzer (trade name, produced by Nikkiso Co., Ltd.).

From the standpoint of obtaining a coating film excellent in pearly luster, the interference pigment for use preferably has a thickness of 0.05 to 1 μm, and particularly preferably 0.1 to 0.8 μm.

From the standpoint of forming a coating film that exhibits high gloss in highlight, and dense metallic cr pearly luster with lower graininess, the flake-effect pigment (B) for use in the effect pigment dispersion preferably has an average particle size of 1 to 100 μm, more preferably 5 to 50 μm, and particularly preferably 7 to 30 μm. The flake-effect pigment (B) for use preferably has a thickness of 0.01 to 1.0 μm, and particularly preferably 0.02 to 0.5 μm.

From the standpoint of obtaining a coating film excellent in metallic or pearly luster, the content of the flake-effect pigment (B) in the effect pigment dispersion is, on a solids basis, preferably 2 to 97 parts by mass, particularly preferably 5 to 65 parts by mass, and still more preferably 10 to 60 parts by mass, per 100 parts by mass of the total solids content in the effect pigment dispersion.

Cellulose Nanofibers (C)

The cellulose nanofibers (C) in the effect pigment dispersion have a carboxyl group amount of 0.4 to 1.0 mmol/g based on the absolute dry mass of the cellulose nanofibers and have a transparency of 80% or more in a 1.0 mass % aqueous dispersion of the cellulose nanofibers.

The cellulose nanofibers for use in the effect pigment dispersion are cellulose nanofibers having a low carboxyl group amount and high transparency, from the standpoint of forming a coating film excellent in water resistance and metallic or pearly luster, and obtaining an effect pigment dispersion with higher viscosity stability.

The cellulose nanofibers may also be referred to as cellulose nanofibrils, fibrillated cellulose, or nanocellulose crystals.

The cellulose nanofibers are preferably oxidized cellulose nanofibers (hereinafter also referred to as "oxidized CNF") obtained by defibrating oxidized cellulose obtained by introducing carboxyl groups into a cellulose starting material. The cellulose nanofibers have a carboxyl group amount of 0.4 to 1.0 mmol/g, more preferably 0.4 to 0.8 mmol/g, and still more preferably 0.4 to 0.6 mmol/g, based on the absolute dry mass of the cellulose nanofibers, and have a transparency of 80% or more, preferably 85% or more, and more preferably 90% or more, in a 1.0 mass % aqueous dispersion of the cellulose nanofibers.

Starting Material

Examples of cellulose starting materials include plant materials (e.g., wood, bamboo, hemp, jute, kenaf, farmland waste, cloth, and pulp (softwood unbleached kraft pulp (NUKP), softwood bleached kraft pulp (NBKP), hardwood unbleached kraft pulp (LUKP), hardwood bleached kraft pulp (LBKP), softwood unbleached sulfite pulp (MUSS), softwood bleached sulfite pulp (NBSP), thermomechanical pulp (TMP), recycled pulp, and waste paper), animal materials (e.g., Ascidiacea), algae, microorganisms (e.g., acetic acid bacteria (Acetobacter)), and microorganism-producing products; any of them can be used. Plant- or microorganism-derived cellulose starting materials are preferable, and plant-derived cellulose starting materials are more preferable.

Introduction of Carboxyl Groups

Carboxyl groups can be introduced into the above cellulose starting material by oxidizing (carboxylating) the cellulose starting material by a known method.

Examples of oxidation include a method of oxidizing the cellulose starting material in water using an oxidizing agent in the presence of an N-oxyl compound, and bromide, iodide, or a mixture thereof. This oxidation reaction selectively oxidizes the primary hydroxyl group at the C6 position of the pyranose ring on the surface of cellulose. As a result, oxidized cellulose having, on its surface, an aldehyde group and a carboxyl group (—COOH) or a carboxylate group (—COO⁻) can be obtained. The concentration of cellulose during the reaction is not particularly limited, but is preferably 5 mass % or less.

The N-oxyl compound refers to a compound that can generate nitroxy radicals. As the N-oxyl compound, any compound can be used as long as it is a compound that promotes the desired oxidation reaction. Examples include 2,2,6,6-tetramethylpiperidine-1-oxy radical (TEMPO) and derivatives thereof (e.g., 4-hydroxy TEMPO).

The amount of the N-oxyl compound used is not particularly limited as long as it is a catalyst amount capable of oxidizing cellulose as a starting material. The amount of the N-oxyl compound is preferably 0.01 mmol to 10 mmol, more preferably 0.01 mmol to 1 mmol, and still more preferably 0.05 mmol to 0.5 mmol, per gram of absolutely dry cellulose. The concentration thereof is preferably about 0.1 mmol/L to 4 mmol/L relative to the reaction system.

Bromide is a compound containing bromine, and contains alkali metal bromides that can be dissociated and ionized in water. Iodide is a compound containing iodine, and contains alkali metal iodides.

The amount of the bromide or iodide used can be selected within the range in which the oxidation reaction can be promoted. The total amount of the bromide and iodide is preferably 0.1 mmol to 100 mmol, more preferably 0.1 mmol to 10 mmol, and still more preferably 0.5 mmol to 5 mmol, per gram of absolutely dry cellulose.

As the oxidizing agent, known oxidizing agents can be used. Examples include halogen, hypohalous acid, halous acid, perhalogenic acid, or salts thereof, halogen oxide, and peroxide. Preferable among these is sodium hypochlorite, which is inexpensive and has a low environmental burden.

The amount of the oxidizing agent used is preferably 0.5 mmol to 500 mmol, more preferably 0.5 mmol to 50 mmol, and still more preferably 1 mmol to 25 mmol, per gram of absolutely dry cellulose. Further, the amount of the oxidizing agent used is preferably 1 mol to 40 mol, for example, per mol of the N-oxyl compound.

In the cellulose oxidation step, the reaction can proceed efficiently even under relatively mild conditions. Therefore, the reaction temperature is preferably 4° C. to 40° C., and may be room temperature of about 15° C. to 30° C. As the reaction progresses, carboxyl groups are formed in cellulose; thus, the pH of the reaction liquid decreases. In order to allow the oxidation reaction to proceed efficiently, it is preferable to add an alkaline solution, such as an aqueous sodium hydroxide solution, during the reaction to maintain the pH of the reaction liquid at about 8 to 12, and preferably about 10 to 11. Water is preferable as the reaction medium because it is easy to handle and side reactions are less likely to occur.

The reaction time in the oxidation reaction can be suitably set according to the degree of progress of oxidation, and is generally 0.5 hours to 6 hours, and preferably 0.5 hours to 4 hours.

The oxidation reaction may be carried out in two steps. For example, carboxylated cellulose obtained by filtration after the completion of the first-step reaction is oxidized again under the same or different reaction conditions, whereby the reaction is not inhibited by salts produced as by-products in the first-step reaction, and the cellulose can be oxidized efficiently.

Another example is the method of oxidation by bringing an ozone-containing gas into contact with the cellulose starting material. As a result of this oxidation reaction, the hydroxyl groups at least at positions of 2 and 6 of the pyranose ring are oxidized, and cellulose chains are decomposed.

The ozone concentration in the ozone-containing gas is preferably 50 g/m$^3$ to 250 g/m$^3$, and more preferably 50 g/m$^3$ to 220 g/m. The amount of ozone added to the cellulose starting material is preferably 0.1 parts by mass to 30 parts by mass, and more preferably 5 parts by mass to 30 parts by mass, based on the solids content of the cellulose starting material taken as 100 parts by mass.

The ozone treatment temperature is preferably 0° C. to 50° C., and more preferably 20° C. to 50° C. The ozone treatment time is not particularly limited, but is about 1 minute to 360 minutes, and preferably about 30 minutes to 360 minutes. When the ozone treatment conditions are within these ranges, excessive oxidation and decomposition of cellulose can be prevented, and the yield of oxidized cellulose increases.

After the ozone treatment, an additional oxidation treatment may be performed using an oxidizing agent. The oxidizing agent used in the additional oxidation treatment is not particularly limited. Examples include chlorine compounds, such as chlorine dioxide and sodium chlorite; and oxygen, hydrogen peroxide, persulfate, and peracetic acid. For example, the additional oxidation treatment can be performed by dissolving such an oxidizing agent in water or a polar organic solvent such as alcohol to prepare an oxidizing agent solution, and immersing the cellulose starting material in the solution.

The amount of carboxyl groups, which indicate the degree of modification of oxidized cellulose, can be adjusted by controlling the reaction conditions, such as the amount of the oxidizing agent added and the reaction time. The amount of carboxyl groups is 0.4 to 1.0 mmol/g based on the absolute dry mass of the oxidized cellulose. If the amount of carboxyl groups is less than 0.4 mmol/g, a large amount of energy is required for defibration to oxidized CNF. If oxidized cellulose with a carboxyl group amount exceeding 1.0 mmol is used as a raw material, the viscosity stability of the effect pigment dispersion becomes insufficient. In particular, the amount of carboxyl groups is preferably 0.4 to 0.8 mmol/g, and more preferably 0.4 to 0.6 mmol/g, based on the absolute dry mass of the oxidized cellulose, from the standpoint of the appearance of the formed coating film and the viscosity stability of the effect pigment dispersion. In the present specification, when indicating the degree of modification, the amount of carboxyl groups refers to the total amount of carboxyl groups (—COOH) and carboxylate groups (—COO$^-$).

Defibration

The device used for defibration is not particularly limited. Examples include high-speed rotary type, colloid mill type, high-pressure type, roll mill type, ultrasonic type, and other types of devices; a high-pressure or ultrahigh-pressure homogenizer is preferable, and a wet high-pressure or ultrahigh-pressure homogenizer is more preferable. The device is preferably capable of applying a strong shear force to the cellulose starting material or oxidized cellulose (generally in the form of a dispersion). The pressure that can be applied by the device is preferably 50 MPa or more, more preferably 100 MPa or more, and still more preferably 140 MPa or more. The device is preferably a wet high-pressure or ultrahigh-pressure homogenizer capable of applying the above pressure to the cellulose starting material or oxidized cellulose (generally in the form of a dispersion), and applying a strong shear force. As a result, defibration can be performed efficiently. The number of times of treatment (pass) with the defibration device may be once, or twice or more, and is preferably twice or more.

In the dispersion treatment, the oxidized cellulose is generally dispersed in a solvent. The solvent is not particularly limited as long as it can disperse the oxidized cellulose. Examples include water, organic solvents (e.g., hydrophilic organic solvents such as methanol), and mixed solvents thereof. Since the cellulose starting material is hydrophilic, the solvent is preferably water.

The solids concentration of the oxidized cellulose in the effect pigment dispersion is generally 0.1 mass % cr more, preferably 0.2 mass % or more, and still more preferably 0.3 mass % or more. Due to this, the amount of liquid is appropriate for the amount of the cellulose fiber material, which is efficient. The upper limit is generally 10 mass % or less, and preferably 6 mass % or less. This makes it possible to maintain fluidity.

The order of the defibration treatment and the dispersion treatment is not particularly limited. Either of these treatments may be performed first, or both treatments may be performed at the same time; however, it is preferable to perform the defibration treatment after the dispersion treatment. The combination of these treatments may be performed at least once, and may be repeated twice or more.

A pretreatment may be performed, if necessary, before the defibration treatment or the dispersion treatment. The pretreatment may be performed using a mixing, stirring, emulsifying, and dispersing device, such as a high-speed shear mixer.

Transparency

The transparency as used in the present specification refers to the transmittance of light at a wavelength cf 660 nm when the oxidized CNF is formed into an aqueous dispersion with a solids content of 1% (w/v). The method for measuring the transparency of the oxidized ONF is as follows:

A ONF dispersion (solids content: 1% (w/v), dispersion medium: water) is prepared, and the transmittance of light at 660 nm is measured with a UV-VIS spectrophotometer UV-1800 (produced by Shimadzu Corporation) using a square cell with an optical path length of 10 mm.

The transparency in a 1.0 mass % aqueous dispersion of the cellulose nanofibers is preferably 80% or more, from the standpoint of forming an effect coating film that exhibits excellent metallic or pearly luster with lower graininess. A transparency of less than 80% is not desirable from the standpoint of inferior metallic or pearly luster with relatively higher graininess.

The transparency of the oxidized CNF can be adjusted by a person skilled in the art by suitably setting the reaction conditions (e.g., adjusting the amount of the oxidizing agent) in the production of oxidized CNF from the cellulose starting material.

Average Fiber Diameter and Aspect Ratio of Oxidized CNF

The average fiber diameter of the oxidized CNF is preferably 3 nm or more or 500 nm or less, more preferably 3 nm or more or 50 nm or less, and still more preferably 3 nm or more or 20 nm or less. The average fiber diameter and average fiber length of the cellulose nanofibers can be calculated as the number average fiber diameter or fiber length, for example, by preparing a 0.001 mass % aqueous dispersion of the oxidized CNF, thinly spreading the diluted dispersion on a mica sample table, drying it by heating at 50° C. to prepare a sample for observation, and measuring the cross-sectional height of the shape image observed with an atomic force microscope (AFM).

The average aspect ratio of the oxidized CNF is generally 50 or more. The upper limit is not particularly limited, but is generally 1000 or less, preferably 700 or less, and more preferably 500 or less. The average aspect ratio can be calculated by the following formula (1):

$$\text{Aspect ratio} = \text{average fiber length/average fiber diameter} \tag{1}$$

Viscosity Stability

It is desirable that the cellulose nanofibers (C) used in the present invention are less likely to undergo changes in viscosity, even when the cellulose nanofibers are subjected to shear for a long period of time. Specifically, it is preferable to use 300 ml of a cellulose nanofiber aqueous dispersion with a solids concentration of 0.5% (when the aqueous dispersion is placed in a 500-ml beaker, the inside of the beaker is vertically stirred to form a uniform state, and then stirring is performed at a liquid temperature of 23° C. for 24 hours using a magnetic stirrer, while maintaining a slightly (2 to 3 mm) recessed state at the center of the liquid surface, the retention rate ($v_{post}/v_{pre} \times 100(\%)$) of the viscosity of the aqueous dispersion after stirring ($v_{post}$) to the viscosity of the aqueous dispersion before stirring ($v_{pre}$) is 50% or more, and preferably 70% or more), from the standpoint of, for example, the viscosity stability of the effect pigment dispersion and the appearance of the obtained coating film.

Further, in terms of viscosity stability, the effect pigment dispersion comprising the cellulose nanofibers (C) according to the present invention satisfies the following. The effect pigment dispersion is prepared, a part thereof is allowed to stand for 6 hours, and then the viscosity ($v_1$) at a shear rate of 0.1 ($s^{-1}$) is measured. The remaining 300 g of the effect pigment dispersion is placed in a 500-mL beaker, and the inside of the beaker is vertically stirred to form a uniform state. Thereafter, stirring is performed at a temperature of 23° C. at a rate of 1,000 rpm for 24 hours using a magnetic stirrer, followed by standing for 6 hours. Then, the viscosity ($v_2$) at a shear rate of 0.1 ($s^{-1}$) is measured. The change in viscosity ($v_2$) after stirring with respect to viscosity ($v_1$) before stirring ($|v_1-v_2|/v_1 \times 100$ (%)) is preferably less than 60%, more preferably less than 40%, and still more preferably less than 30%.

Other Rheology Control Agent

From the standpoint of obtaining a coating film excellent in water resistance and metallic or pearly luster as well as high viscosity stability, the effect pigment dispersion may also contain another rheology control agent, in addition to the cellulose nanofibers (C). The other rheology control agent for use may be, for example, cellulose nanofibers other than the cellulose nanofibers (C), a polyamide-based rheology control agent, a mineral-based rheology control agent, or a polyacrylic acid-based rheology control agent.

Examples of cellulose nanofibers other than the cellulose nanofibers (C) include carboxylmethylated cellulose nanofibers, phosphate group-containing cellulose nanofibers, and carboxylated cellulose nanofibers in which the amount of carboxyl groups is outside the range of 0.4 to 1.0 mmol/g based on the absolute dry mass of the cellulose nanofibers, or in which the transparency in a 1.0 mass % aqueous dispersion of the cellulose nanofibers is less than 80%.

The polyamide-based rheology control agent includes polyamide amine salts and fatty acid polyamide.

Examples of mineral-based rheology control agents include swelling laminar silicate that has a 2:1-type crystalline structure. Specific examples include smectite group clay minerals, such as natural or synthetic montmorillonite, saponite, hectorite, stevensite, beidellite, nontronite, bentonite, and laponite; swelling mica group clay minerals, such as Na-type tetrasilicic fluorine mica, Li-type tetrasilicic fluorine mica, Na salt-type fluorine taeniolite, and Li-type fluorine taeniolite; and vermiculite; substitution products and derivatives thereof; and mixtures thereof.

Examples of polyacrylic acid-based rheology control agents include sodium polyacrylate, and polyacrylic acid-(meth)acrylic acid ester copolymers.

Examples of commercial products of polyacrylic acid-based rheology control agents include "Primal ASE-60," "Primal TT615," and "Primal RM5" (trade names, produced by The Dow Chemical Company); and "SN Thickener 613," "SN Thickener 618," "SN Thickener 630," "SN Thickener 634," and "SN Thickener 636" (trade names, produced by San Nopco Limited). The acid value of the solids content of the polyacrylic acid-based rheology control agent is preferably 30 to 300 mg KOH/g, and more preferably 80 to 280 mg KOH/g.

When other rheology control agent is added, the content of the other rheology control agent is, on a solids basis, preferably 1 to 200 parts by mass, and more preferably 50 to 150 parts by mass, per 100 parts by mass of the solids content of the cellulose nanofibers (C).

Aqueous Resin Dispersion

From the standpoint of water resistance of the obtained coating film, the effect pigment dispersion may further contain an aqueous resin dispersion.

The aqueous resin dispersion is a dispersion of a resin in an aqueous solvent. Examples of the resin include urethane resins, acrylic resins, polyester resins, olefin resins, alkyd resins, epoxy resins, and polycarboxylic acid resins.

The aqueous resin dispersion may contain, for example, at least one member selected from the group consisting of an aqueous urethane resin dispersion, an aqueous acrylic resin dispersion, an aqueous polyester resin dispersion, an aqueous olefin resin dispersion, and a composite of these resins. The aqueous dispersion may be modified.

Of these, from the standpoint of water resistance of the obtained coating film, an aqueous urethane resin dispersion and an aqueous acrylic resin dispersion are preferable, and an aqueous hydroxy-containing urethane resin dispersion and an aqueous hydroxy-containing acrylic resin dispersion are more preferable.

The aqueous hydroxy-containing acrylic resin dispersion is particularly preferably a core-shell dispersion.

When an aqueous resin dispersion is used, the content of the aqueous resin dispersion is preferably 1 to 60 parts by mass, and more preferably 10 to 40 parts by mass, per 100 parts by mass of the total solids content in the effect pigment dispersion.

Crosslinkable Component

From the standpoint of waterproof adhesion of the obtained coating film, the effect pigment dispersion may further contain a crosslinkable component.

When the effect pigment dispersion contains the aqueous resin dispersion, the crosslinkable component is a component for crosslinking and curing the aqueous resin dispersion by heating. When the effect pigment dispersion does not contain the aqueous resin dispersion, the crosslinkable component may be a self-crosslinkable component; or may be a component for crosslinking and curing part of a colored paint for forming a colored coating film described later, or part of a clear paint for forming a clear coating film described later. Examples of crosslinkable components include amino resins, urea resins, polyisocyanate compounds, blocked polyisocyanate compounds, polyisocyanate compounds blocked with active methylene compounds, epoxy-containing compounds, carboxy-containing compounds, carbodiimide group-containing compounds, hydrazide group-containing compounds, semicarbazide group-containing compounds, and silane coupling agents. Of these, amino resins reactive with a hydroxyl group, polyisocyanate compounds, blocked polyisocyanate compounds, and carbodiimide group-containing compounds reactive with a carboxyl group are preferable. The polyisocyanate compounds and blocked polyisocyanate compounds for use can be those described later in the section "Clear Paint." The crosslinkable components can be used singly, or in a combination of two or more.

When the effect pigment dispersion contains a crosslinkable component, the content of the crosslinkable component is, on a solids basis, preferably 1 to 100 parts by mass, more preferably 5 to 95 parts by mass, and still more preferably 10 to 90 parts by mass, per 100 parts by mass of the solids content of the flake-effect pigment in the effect pigment dispersion, from the standpoint of waterproof adhesion of the coating film.

When the effect pigment dispersion contains a binder resin, such as a base resin or a dispersion resin, described later, and further contains a crosslinkable component, the total amount on a solids basis of the binder resin and the crosslinkable component is, from the standpoint of forming a coating film with metallic luster, preferably 0.1 to 500 parts by mass, more preferably 1 to 300 parts by mass, and still more preferably 10 to 100 parts by mass, per 100 parts by mass of the solids content of the flake-effect pigment in the effect pigment dispersion, from the standpoint of waterproof adhesion of the coating film.

Other Components

The effect pigment dispersion may further suitably contain, if necessary, an organic solvent, a pigment other than the flake-effect pigment (B), a pigment dispersant, an anti-settling agent, an ultraviolet absorber, a light stabilizer, etc.

The pigment other than the flake-effect pigment (B) includes a color pigment and an extender pigment. These pigments can be used singly, or in a combination of two or more. Examples of color pigments include titanium oxide, zinc oxide, carbon black, molybdenum red, Prussian blue, cobalt blue, azo pigments, phthalocyanine pigments, quinacridone pigments, isoindoline pigments, threne pigments, perylene pigments, dioxazine pigments, and diketopyrrolopyrrole pigments. Examples of extender pigments include clay, kaolin, barium sulfate, barium carbonate, calcium carbonate, talc, silica, and alumina white.

The effect pigment dispersion may contain a binder resin, such as a base resin and a dispersion resin, from the standpoint of the adhesion and storage stability of the obtained coating film. However, the effects of the present invention can be brought about even if these resins are not substantially contained.

Examples of base resins include acrylic resins, polyester resins, alkyd resins, and urethane resins.

Dispersion resins for use include existing dispersion resins, such as acrylic resins, epoxy resins, polycarboxylic acid resins, and polyester resins.

The binder resin can be used in the form of the aqueous resin dispersion mentioned above.

When the effect pigment dispersion contains the binder resin mentioned above, the amount thereof is preferably 0.01 to 500 parts by mass, more preferably 5 to 300 parts by mass, and still more preferably 10 to 200 parts by mass, per 100 parts by mass of the flake-aluminum pigment.

When the effect pigment dispersion contains the binder resin mentioned above, the total amount thereof is preferably 0.1 to 8 mass %, more preferably 0.2 to 5 mass %, and still more preferably 0.3 to 4 mass %, based on the mass of the effect pigment dispersion.

Viscosity

The amount of the components described above and formulation of the effect pigment dispersion in the present specification are determined so that the effect pigment dispersion has a viscosity of 100 to 10000 mPa·sec, preferably 200 to 6000 mPa·sec, and more preferably 400 to 6000 mPa·sec, as measured at a rotational speed of 6 revolutions per minute (6 rpm).

Viscosity is defined as the viscosity 1 minute after the start of measurement under predetermined conditions.

Specifically, a prepared effect pigment dispersion is placed in a predetermined container and mixed by stirring with a rotary stirrer with the rotational speed set to 1000 revolutions per minute, until the dispersion becomes homogeneous. Thereafter, the measurement of the viscosity at 6 rpm is started at a temperature of 20° C. using a Brookfield viscometer, and the viscosity 1 minute after the start of measurement ("B6 value" in the present specification) is determined. The viscometer used in this case is a Brookfield viscometer (trade name: LDV-I, produced by Brookfield). The rotational speed of 6 rpm is a typical condition for controlling the viscosity of pseudoplastic fluid. When the viscosity of the effect pigment dispersion at 6 rpm is less than 100 mPa·sec, the liquid sags in the coating process, and the orientation of the flake-aluminum pigment is disturbed, resulting in failure to obtain a dense metallic coating film with low graininess. When the viscosity of the effect pigment dispersion at 6 rpm exceeds 10000 mPa·sec, the viscosity becomes so high that uniform coating becomes difficult, resulting in failure to obtain a dense metallic coating film with low graininess.

When the solids content of the effect pigment dispersion is adjusted to 0.5 mass %, the viscosity of the effect pigment dispersion 1 minute after the start of revolution ("the B60 value" in the present specification) as measured with a Brookfield viscometer at 60 revolutions per minute (60 rpm) at a temperature of 20° C. is preferably 30 to 2000 mPa·s, more preferably 40 to 1800 mPa·s, and still more preferably 50 to 1500 mPa·s, from the standpoint of obtaining a coating film with excellent metallic luster. The viscometer used in this measurement is a Brookfield viscometer (trade name: LVDV-I, produced by Brookfield).

Ti Value

The "Ti value" (thixotropic index) as used in the present specification refers to the value described in JIS K5101-6-2 (2004), Pigment Test Method, Section 2, Rotational Viscometer Method; and can be determined by measuring the viscosity (mPa·s) at 20° C. at 6 rpm and 60 rpm using a Brookfield viscometer, and calculating the value determined by "the viscosity measured at 6 rpm/viscosity measured at 60 rpm." The measured Ti values within the range of 1.5 to 350 satisfy the requirements for the pigment dispersion paste formed from the effect pigment dispersion. The Ti value is preferably 2 to 200, and more preferably 2.5 to 120. A Ti value of 1.5 or more is preferable from the standpoint of the unlikeliness of occurrence of precipitation of the pigment, and a Ti value of 10 or less is preferable from the standpoint of reducing aggregation of the pigment.

Method for Forming Multilayer Coating Film

The method for forming a multilayer coating film according to one embodiment of the present invention comprises applying a colored paint to a substrate to form a colored coating film, applying the effect pigment dispersion to the formed cured or uncured colored coating film to form an effect coating film, and applying a clear paint to the formed cured or uncured effect coating film to form a clear coating film.

A base coating film formed from a base paint may also be formed between the colored coating film and the effect coating film. The base paint is preferably a transparent paint.

Specifically, the method for forming a multilayer coating film according to one embodiment of the present invention may comprise, for example, the steps of stacking coating films in the following order.

A method for forming a multilayer coating film (1): a substrate, a colored coating film, an effect coating film, a clear coating film A method for forming a multilayer coating film (2): a substrate, a colored coating film, a base coating film, an effect coating film, a clear coating film In the method for forming a multilayer coating film (1), it is preferred that the colored coating film, the effect coating film, and the clear coating film each be stacked by a wet-on-wet technique and that these three layers be cured simultaneously.

In the method for forming a multilayer coating film (2), it is preferred that after being formed, the colored coating film be cured, that, afterward, the base layer, the effect coating film, and the clear coating film each be stacked by a wet-on-wet technique; and that these three layers be cured simultaneously.

Substrate

The multilayer coating film according to one embodiment of the present invention is formed on a substrate shown below. Examples of substrates include metal materials including metals, such as iron, zinc, and aluminum and alloys containing these metals; molded products of these metals; molded products of, for example, glass, plastic, or foam; and films. Degreasing treatment or surface treatment can be suitably performed depending on the material to obtain a substrate. Examples of surface treatments include phosphate treatment, chromate treatment, and composite oxide treatment. When the material of the substrate is metal, is preferred that an undercoating film be formed on a surface-treated metal material using, for example, a cationic electrodeposition paint.

When the material of the substrate is plastic, it is preferred that a primer coating film be formed on a degreased plastic material using a primer paint.

Colored Paint

Specifically, the colored paint for use can be a known thermosetting paint that contains a base resin, a crosslinking agent, a pigment, and a solvent such as an organic solvent and/or water, as main components. Examples of thermosetting paints include intermediate paints and base paints.

Examples of base resins for use in the colored paint include thermosetting resins and room-temperature-curable resins. However, from the standpoint of, for example, water resistance, chemical resistance, and weatherability, thermosetting resins arc preferable for use.

The base resin preferably has excellent weatherability and transparency. Specific examples of base resins include acrylic resins, polyester resins, epoxy resins, and urethane resins.

Examples of acrylic resins include resins obtained by copolymerizing an α,β-ethylenically unsaturated carboxylic acid, a (meth)acrylic acid ester having a functional group, such as a hydroxyl group, an amide group, a methylol group, or an epoxy group, other (meth)acrylic acid ester, styrene, and the like.

Examples of polyester resins include polyester resins obtained by a condensation reaction of a polyhydric alcohol, such as ethylene glycol, propylene glycol, butylene glycol, 1,6-hexanediol, trimethylolpropane, or pentaerythritol, with a polyvalent carboxylic acid component, such as adipic acid, isophthalic acid, terephthalic acid, phthalic anhydride, hexahydrophthalic anhydride, or trimellitic anhydride.

Examples of epoxy resins include bisphenol A-type epoxy resins produced by a condensation reaction of bisphencl A with epichlorohydrin.

Examples of urethane resins include compounds obtained by an addition reaction of a diisocyanate compound with a polyhydric alcohol, and urethane resins whose molecular weight is increased by reacting an acrylic resin, a polyester resin, or an epoxy resin as described above with a diisocyanate compound.

The colored paint may be an aqueous paint, or a solvent-based paint. From the standpoint of decreasing the VOCs of the paint, the colored paint is preferably an aqueous paint. When the colored paint is an aqueous paint, the base resin for use can be a resin that contains hydrophilic groups (e.g., a carboxyl group, a hydroxyl group, a methylol group, an amino group, a sulfonate group, and a polyoxyethylene bond; most typically a carboxyl group) in an amount sufficient to solubilize or disperse the resin in water. By neutralizing the hydrophilic groups to form the system into an alkali salt, the base resin can be solubilized or dispersed in water. The amount of hydrophilic groups, for example, carboxyl groups, in doing this is not particularly limited, and can be freely determined depending on the solubility or dispersity in water. The amount of hydrophilic groups is typically about 10 mg KOH/g or more, and preferably 30 to 200 mg KOH/g, based on the acid value. Examples of alkaline substances for use in neutralization include sodium hydroxide and amine compounds.

The resin can be dispersed in water by subjecting the polymerizable component to emulsion polymerization in the presence of a surfactant and a water-soluble resin. The aqueous dispersion of the resin can also be obtained by dispersing the resin in water in the presence of, for example, an emulsifier. In the case of resin dispersion in water, the base resin may be completely free of hydrophilic groups; or may contain hydrophilic groups in an amount smaller than that of the water-soluble resin described above.

The crosslinking agent is used for crosslinking and curing the base resin by heating, and the crosslinking agent for use can be those listed as the crosslinkable component in the effect pigment dispersion.

The ratio of the components in the colored paint may be freely selected, as required. However, from the standpoint of, for example, water resistance and finish, it is typically preferred that the ratio of the base resin be 60 to 90 mass %, and particularly 70 to 85 mass %, based on the total mass of both components; and that the ratio of the crosslinking agent be 10 to 40 mass %, and particularly 15 to 30 mass %, based on the total mass of both components.

The pigment imparts a color and undercoat hiding power to the colored coating film formed from the colored paint. The type and amount of the pigment can be suitably adjusted depending on the hue or lightness desired for the multilayer coating film. For example, by adjusting the type and amount of the pigment, the lightness L* value of the coating film obtained from the colored paint can be adjusted so as to fall within the range of 0.1 to 80, preferably 0.1 to 70, and more preferably 0.1 to 60. Examples of pigments include metallic pigments, rust preventive pigments, color pigments, and extender pigments. Of these, color pigments are preferably used; from the standpoint of obtaining a coating film with excellent undercoat hiding power and metallic luster, black pigments are more preferably used. The type and amount of the pigment in the colored paint are preferably adjusted so that the L* of the colored coating film falls within the above ranges.

The thickness of the cured colored coating film obtained from the colored paint is preferably 3 μm to 50 μm, more preferably 5 to 45 μm, and still more preferably 8 to 40 μm from the standpoint of, for example, undercoat hiding power and the metallic luster of the multilayer coating film. For example, the thickness of the cured colored coating film is 15 μm to 50 μm, preferably 18 to 45 μm, and more preferably 20 to 40 μm.

The colored paint can be applied by a typical method. When the colored paint is an aqueous paint, for example, deionized water and optionally additives, such as a thickener and an antifoaming agent, are added to the colored paint so that the solids content is adjusted to about 30 to 70 mass % and the viscosity is adjusted to 500 to 6000 cps/6 rpm (Brookfield viscometer). Then, the adjusted paint is applied to the surface of a substrate by spray coating, rotary atomization coating, or the like. An electrostatic charge may optionally be applied during the coating process.

The monochrome hiding film thickness of the colored paint is preferably 80 μm or less, more preferably 10 to 60 μm, and still more preferably 15 to 50 μm from the standpoint of color stability. In the present specification, the "monochrome hiding film thickness" refers to a value determined in the following manner. A monochrome checker-patterned, hiding-chart specified in section 4.1.2 of JIS K5600-4-1 is attached to a steel plate. Then, a paint is applied by inclined coating so that the film thickness continuously varies, and is dried or cured. The coating surface is then visually observed under diffused daylight, and the minimum film thickness in which the monochrome border of the checker of the hiding-chart disappears is measured by an electromagnetic film thickness meter.

When the effect pigment dispersion is applied to an uncured coating film formed from the colored paint as in the method for forming a multilayer coating film (1), the effect pigment dispersion may be applied after the applied colored paint is allowed to stand at room temperature for 15 to 30 minutes, or heated at a temperature of 50 to 100° C. for 30 seconds to 10 minutes.

When a base paint is applied to the uncured coating film formed from the colored paint in the method for forming a multilayer coating film (2), the base paint may be applied after the applied colored paint is allowed to stand at room temperature for 15 to 30 minutes, or heated at a temperature of 50 to 100° C. for 30 seconds to 10 minutes.

When the colored coating film is cured in the method for forming a multilayer coating film (2), the heating temperature is preferably 110 to 180° C., and particularly preferably 120 to 160° C. The time period for heating treatment is preferably 10 to 60 minutes, and particularly preferably 15 to 40 minutes.

Base Paint

The base paint for use may be a known paint composition. In particular, the base paint for use is preferably a paint composition typically used in coating, for example, vehicle bodies.

The base paint is preferably a paint that contains a base resin, a curing agent, and a medium composed of water and/or an organic solvent.

The base resin and curing agent for use may be known compounds commonly used in the art.

The base resin is preferably a resin excellent in, for example, weatherability and transparency. Specifically, the base resin includes acrylic resins, polyester resins, epoxy resins, and urethane resins.

Examples of acrylic resins include α,β-ethylenically unsaturated carboxylic acids; (meth)acrylic acid esters having a functional group such as a hydroxyl group, an amide group, or a methylol group; other (meth)acrylic acid esters; and resins obtained by copolymerizing a monomer component, such as styrene.

The polyester resins for use may be those obtained by subjecting a polybasic acid, polyhydric alcohol, or modified oil to condensation reaction by an ordinary method.

Examples of epoxy resins include epoxy resins obtained by a method in which an epoxy ester is synthesized by a reaction of an epoxy group with an unsaturated fatty acid, and an α,β-unsaturated acid is added to this unsaturated group; or by a method in which the hydroxyl group of an epoxy ester and a polybasic acid, such as phthalic acid or trimellitic acid, are esterified.

Examples of urethane resins include urethane resins obtained by reacting at least one diisocyanate compound selected from the group consisting of aliphatic diisocyanate compounds, alicyclic diisocyanate compounds, and aromatic diisocyanate compounds with at least one polyol compound selected from the group consisting of polyether polyols, polyester polyols, and polycarbonate polyols; and urethane resins obtained by reacting the acrylic resin, polyester resin, or epoxy resin with a dipolyisocyanate compound, and increasing the molecular weight of the reaction product.

The base paint may be an aqueous paint, or a solvent-based paint. However, from the standpoint of decreasing the VOCs of the paint, the base paint is preferably an aqueous paint. When the base paint is an aqueous paint, the base resin for use can be a resin that contains hydrophilic groups (e.g., a carboxyl group, a hydroxyl group, a methylol group, an amino group, a sulfonate group, and a polyoxyethylene bond; most preferably a carboxyl group) in an amount sufficient to solubilize or disperse the resin in water. By neutralizing the hydrophilic groups to form the system into an alkali salt, the base resin can be solubilized or dispersed in water. The amount of hydrophilic groups, for example, carboxyl groups, in doing this is not particularly limited, and can be freely determined depending on the solubility or dispersity in water. The amount of hydrophilic groups is typically about 10 mg KOH/g or more, and preferably 30 to 200 mg KOH/g, based on the acid value. Examples of alkaline substances for use in neutralization include sodium hydroxide and amine compounds.

The resin can be dispersed in water by subjecting the monomer component to emulsion polymerization in the presence of a surfactant and an optional water-soluble resin. The aqueous dispersion of the resin can also be obtained by dispersing the resin in water in the presence of, for example, an emulsifier. In this case of resin dispersion in water, the base resin may be completely free of hydrophilic groups; or may contain hydrophilic groups in an amount smaller than that of the water-soluble resin described above.

The curing agent is for use in crosslinking and curing the base resin by heating. Examples include amino resins, polyisocyanate compounds (including unblocked polyisocyanate compounds and blocked polyisocyanate compounds), epoxy group-containing compounds, carboxy-containing compounds, carbodiimide group-containing compounds, hydrazide group-containing compounds, and semicarbazide group-containing compounds. Of these, amino resins and polyisocyanate compounds, which are reactive with hydroxyl groups, and carbodiimide group-containing compounds, which are reactive with carboxyl groups, are preferable. These curing agents may be used singly, or in a combination of two or more.

Specifically, amino resins obtained by condensation or co-condensation of, for example, melamine, benzoguanamine, or urea with formaldehyde; or amino resins obtained by further etherifying such amino resins with a lower monohydric alcohol, are suitably used. Additionally, polyisocyanate compounds are also suitably used.

The proportion of each component of the base paint can be freely determined, as required. However, from the standpoint of, for example, water resistance and appearance, it is preferred that the proportion of the base resin be typically 50 to 90 mass %, and particularly 60 to 85 mass %, based on the total mass of the base resin and curing agent; and that the proportion of the curing agent be typically 10 to 50 mass %, and particularly 15 to 40 mass %, based on the total mass of the base resin and curing agent.

For the base paint, an organic solvent may optionally be used. Specifically, organic solvents typically used in paint are usable. Examples of organic solvents include hydrocarbons, such as toluene, xylene, hexane, and heptane; esters, such as ethyl acetate, butyl acetate, ethylene glycol monomethyl ether acetate, diethylene glycol monoethyl ether acetate, and diethylene glycol monobutyl acetate; ethers, such as ethylene glycol monomethyl ether, ethylene glycol diethyl ether, diethylene glycol monomethyl ether, and diethylene glycol dibutyl ether; alcohols, such as butanol, propanol, octanol, cyclohexanol, and diethylene glycol; and ketones, such as methyl ethyl ketone, methyl isobutyl ketone, cyclohexanone, and isophorone. These organic solvents may be used singly, or in a combination of two or more.

The base paint may contain, for example, a color pigment, an extender pigment, an ultraviolet absorber, an antifoaming agent, a rheology control agent, a rust inhibitor, and a surface-adjusting agent, as necessary, in addition to the components described above.

The base paint is preferably a transparent paint or a colored paint. From the standpoint of obtaining a coating film excellent in metallic or pearly luster, the base paint is preferably a transparent paint.

A base paint being a transparent paint indicates that a 35-μm-thick film obtained by applying a base paint has a haze value of 25% or less on a dry film basis. In the present invention, "haze value" is defined as a value determined by applying a base paint to a smooth PTFE plate, curing the paint, measuring the peeled coating film with a COH-300A turbidimeter (trade name, produced by Nippon Denshoku Industries Cc., Ltd.), and calculating the haze value from the measured diffuse light transmittance (DE) and parallel light transmittance (PT) using the following formula (2).

$$\text{Haze Value} = 100 * DF/(DF + PT) \tag{2}$$

When the base paint is a transparent paint, the base paint does not contain a color pigment, and may optionally contain an extender pigment. Examples of extender pigments include barium sulfate, barium carbonate, calcium carbonate, aluminum silicate, silica, magnesium carbonate, talc, and alumina white.

When an extender pigment is added, the amount of the extender pigment is preferably 0.1 to 30 parts by mass, and more preferably 0.1 to 20 parts by mass, per 100 parts by mass of the resin solids content in the base paint.

When the base paint is a colored paint, the base paint contains a color pigment. From the standpoint of light transmission control, the base paint may contain a color pigment, such as titanium oxide and carbon black; and may further optionally contain a known color pigment, other than titanium oxide and carbon black. The color pigment is not particularly limited. Specifically, one pigment, or a combination of two or more pigments can be selected from, for example, composite metal oxide pigments (e.g., iron oxide pigments and titanium yellow), azo pigments, quinacridone pigments, diketopyrrolopyrrole pigments, perylene pigments, perinone pigments, benzimidazolone pigments, isoindoline pigments, isoindolinone pigments, metal chelate azo pigments, phthalocyanine pigments, indanthrone pigments, dioxane pigments, threne pigments, indigo pigments, or effect pigments. The effect pigments include examples listed in the "Colored Paint" section.

When the base paint contains a color pigment, the amount of the color pigment is preferably 0.1 to 50 parts by mass, and more preferably 0.2 to 40 parts by mass, per 100 parts by mass of the resin solids content in the base paint.

The base coating film obtained from the base paint has a thickness of preferably 3 μm or more, more preferably 3 to 20 μm, and still more preferably 5 to 15 μm on a cured film basis, from the standpoint of smoothness and metallic luster.

The base paint can be applied by a typical method. Examples include methods such as air spray coating, airless spray coating, and rotary-atomization coating. When applying the base paint, electrostatic charge may optionally be applied. Of such methods, rotary-atomization electrostatic coating and air-spray electrostatic coating are preferable, with rotary-atomization electrostatic coating being particularly preferable.

When air spray coating, airless spray coating, or rotary-atomization coating is performed, it is preferred that the base paint be adjusted to have a solids content and a viscosity suitable for coating by adding water and/or an organic solvent, and optional additives such as a rheology control agent and an antifoaming agent.

The base paint has a solids content of 10 to 60 massi, preferably 15 to 55 mass %, and still more preferably 20 to 50 mass %. The base paint has a viscosity of preferably 200 to 7000 cps, more preferably 300 to 6000 cps, and still more preferably 500 to 5000 cps, as measured with a Brookfield viscometer at 20° C. and at 6 rpm.

Application of Effect Pigment Dispersion

From the standpoint of obtaining a coating film excellent in metallic or pearly luster, the effect pigment dispersion in the method for forming a multilayer coating film according to one embodiment of the present invention is adjusted so as to have a solids content during the coating process of 0.1 to 10 parts by mass, preferably 0.5 to 8 parts by mass, and still more preferably 2 to 6 parts by mass, per 100 parts by mass of all of the components of the effect pigment dispersion; and adjusted so as to have a viscosity of 100 to 10000 mPa·sec, preferably 200 to 8000 mPa·sec, and still more preferably 400 to 6000 mPa·sec, as measured with a Brookfield viscometer at a rotational speed of 6 revolutions per minute.

The effect pigment dispersion can be applied by a method, such as electrostatic coating, air spray, or airless spray. In the method for forming a multilayer coating film according to one embodiment of the present invention, rotary-atomization electrostatic coating is particularly preferable.

The film thickness 30 seconds after the effect pigment dispersion is adhered to the substrate is preferably 3 to 55 μm, more preferably 4 to 50 μm, and still more preferably 5 to 45 μm, from the standpoint of obtaining a coating film with excellent metallic luster. When the effect pigment dispersion contains 0.01 to 0.2 μm of a vapor deposition metal flake pigment and/or an aluminum flake pigment, the film thickness 30 seconds after the effect pigment dispersion is adhered to the substrate is preferably 3 to 45 μm, more preferably 4 to 24 μm, and still more preferably 5 to 23 μm.

A clear paint can be applied after the effect pigment dispersion is applied and allowed to stand at room temperature for 15 to 30 minutes, or after the effect pigment dispersion is applied and heated at a temperature of 50 to 100° C. for 30 seconds to 10 minutes.

The effect coating film has a thickness of preferably 0.1 to 4 μm, and more preferably 0.15 to 3 μm on a dry film basis. When the effect pigment dispersion contains 0.01 to 0.2 μm of a vapor deposition metal flake pigment and/or an aluminum flake pigment, the effect coating film has a thickness of preferably 0.05 to 2.0 μm, and more preferably 0.08 to 1.6 μm on a dry film basis.

In the method for forming a multilayer coating film according to one embodiment of the present invention, a clear paint is applied to an effect coating film obtained by applying the effect pigment dispersion, thus forming a clear coating film.

Clear Paint

The clear paint for use may be any known thermosetting clear-coat paint composition. Examples of thermosetting clear-coat paint compositions include organic solvent-based thermosetting paint compositions containing a base resin having a crosslinkable functional group and a curing agent; aqueous thermosetting paint compositions containing a base resin having a crosslinkable functional group and a curing agent; and powdery thermosetting paint compositions containing a base resin having a crosslinkable functional group and a curing agent.

Examples of crosslinkable functional groups present in the base resin include carboxyl groups, hydroxyl groups, epoxy groups, and silanol groups. Examples of the type of base resin include acrylic resins, polyester resins, alkyd resins, urethane resins, epoxy resins, and fluororesins. Examples of curing agents include polyisocyanate compounds, blocked polyisocyanate compounds, melamine resins, urea resins, carboxy-containing compounds, carboxy-containing resins, epoxy-containing resins, and epoxy-containing compounds.

The combination of a base resin and a curing agent in the clear paint is, for example, preferably a combination of a carboxy-containing resin and an epoxy-containing resin, a combination of a hydroxy-containing resin and a polyisocyanate compound, a combination of a hydroxy-containing resin and a blocked polyisocyanate compound, and a combination of a hydroxy-containing resin and a melamine resin.

The clear paint may be a one-component paint or a multiple-component paint, such as a two-component paint.

In particular, the clear paint is preferably a two-component clear paint containing the hydroxy-containing resin and the polyisocyanate compound described below, from the standpoint of the adhesion of the obtained coating film.

Hydroxy-Containing Resin

The hydroxy-containing resin for use may be a known resin that has a hydroxyl group, without any limitation. Examples of hydroxy-containing resins include hydroxy-containing acrylic resins, hydroxy-containing polyester resins, hydroxy-containing polyether resins, and hydroxy-containing polyurethane resins; preferably hydroxy-containing acrylic resins and hydroxy-containing polyester resins; and particularly preferably hydroxy-containing acrylic resins.

The hydroxy-containing acrylic resin has a hydroxy value of preferably 80 to 200 mg KOH/g, and more preferably 100 to 180 mg KOH/g, from the standpoint of scratch resistance and water resistance of the coating film.

The hydroxy-containing acrylic resin has a weight average molecular weight of preferably 2500 to 40000, and more preferably 5000 to 30000, from the standpoint of acidity resistance and smoothness of the coating film.

In the present specification, the weight average molecular weight refers to a value calculated from a chromatogram measured by gel permeation chromatography based on the molecular weight of standard polystyrene. For the gel permeation chromatography, "HLC8120GPC" (produced by Tosoh Corporation) was used. The measurement was conducted using the four columns "TSKgel G-4000HXL," "TSKgel G-3000HXL," "TSKgel G-2500HXL," and "TSKgel G-2000HXL" (trade names, all produced by Tosoh Corporation) under the conditions of mobile phase: tetrahydrofuran, measuring temperature: 40° C., flow rate: 1 cc/min, and detector: RI.

The glass transition temperature of the hydroxy-containing acrylic resin is preferably −40° C. to 20° C., and particularly preferably −30° C. to 10° C. A glass transition temperature of −40° C. or more leads to sufficient coating film hardness. A glass transition temperature of 20° C. or less enables the coating film to maintain smoothness of the coating surface.

Polyisocyanate Compound

A polyisocyanate compound is a compound having at least two isocyanate groups per molecule. Examples include aliphatic polyisocyanates, alicyclic polyisocyanates, aromatic-aliphatic polyisocyanates, aromatic polyisocyanates, and derivatives of these polyisocyanates.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4-or 2,2,4-trimethylhexamethylene diisocyanate, dimer acid diisocyanate, and methyl 2,6-diisocyanatohexanoate (common name: lysine diisocyanate); and aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, and methylenebis(4,1-cyclohexanediyl)diisocyanate (common name: hydrogenated MDI), and norbornane diisocyanate; and alicyclic triisocyanates, such as 1,3,5-triisocvanatocyclohexane, 1,3,5-trimethylisocyanatocyclohexane, 2-(3-isocyanatopropyl)-2,5-di(isocyanatomethyl)-bicyclo(2.2.1) heptane, 2-(3-(isocyanatopropyl)-2,6-di(isocyanatomethyl)-bicyclo(2.2.1)heptane, 3-(3-isocyanatopropyl)-2,5-di (isocyanatomethyl)-bicyclo(2.2.1)heptane, 5-(2-isocyanatoethyl)-2-isocyanatomethy-3-(3-isocyanatopropyl)-bicyclo (2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1) heptane.

Examples of aromatic-aliphatic polyisocyanates include aromatic-aliphatic diisocyanates, such as methylenebis(4,1-phenylene)diisocyanate (common name: MDI), 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; and aromatic-aliphatic triisocyanates, such as 1,3,5-triisocyanatomethylbenzene.

Examples of aromatic polyisocyanates include aromatic diisocyanates, such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI), or 2,6-tolylene diisocyanate (common name: 2,6-TDI) or mixtures thereof, 4,4'-toluidine diisocyanate, and 4,4'-diphenylether diisocyanate; aromatic triisocyanates, such as triphenylmethane-4,4',4"-triisocyanate, 1,3,5-triisocyanatobenzene, and 2,4,6-triisocyanatotoluene; and aromatic tetraisocyanates, such as 4,4'-diphenylmethane-2,2',5,5'-tetraisocyanate.

Examples of derivatives of polyisocyanates include dimers, trimers, biurets, allophanates, urethodiones, urethoimines, isocyanurates, oxadiazinetriones, polymethylene polyphenyl polyisocyanates (crude MDI, polymeric MDI), or crude TDI of the polyisocyanates described above. The polyisocyanate derivatives may be used singly, or in a combination of two or more.

These polyisocyanates and derivatives thereof may be used singly, or in a combination of two or more.

Of the aliphatic diisocyanates, hexamethylene diisocyanate-based compounds are preferably used; and of the alicyclic diisocyanates, 4,4'-methylenebis(cyclohexyl isocyanate) is preferably used. Of these, in particular, derivatives of hexamethylene diisocyanate are most preferable, from the standpoint of, for example, adhesion and compatibility.

The polyisocvanate compound for use may also be a prepolymer that is formed by reacting the polyisocyanate or a derivative thereof with a compound having an active hydrogen group (e.g., a hydroxyl or amino group), reactive with the polyisocyanate, in the presence of an excessive amount of isocyanate groups. Examples of compounds reactive with the polyisocyanate include polyhydric alcohols, low-molecular-weight polyester resins, amines, and water.

The polyisocyanate compound for use may be a blocked polyisocyanate compound in which some or all of the isocyanate groups of the polyisocyanate or a derivative thereof are blocked with a blocking agent.

Examples of blocking agents include phenols, such as phenol, cresol, xylenol, nitrophenol, ethylphenol, hydroxydiphenyl, butylphenol, isopropylphenol, nonylphenol, octylphenol, and methyl hydroxybenzoate; lactams, such as ε-caprolactam, δ-valerolactam, γ-butyrolactam, and β-propiolactam; aliphatic alcohols, such as methanol, ethanol, propyl alcohol, butyl alcohol, amyl alcohol, and lauryl alcohol; ethers, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohols, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oximes, such as formamide oxime, acetamide oxime, acetoxime, methyl ethyl ketoxime, diacetyl monoxime, benzophenone oxime, and cyclohexane oxime; active methylenes, such as dimethyl malonate, diethyl malonate, ethyl acetoacetate, methyl acetoacetate, and acetylacetone; mercaptans, such as butyl mercaptan, t-butyl mercaptan, hexyl mercaptan, t-dodecyl mercaptan, 2-mercaptobenzothiazole, thiophenol, methylthiophenol, and ethylthiophenol; acid amides, such as acetanilide, acetanisidide, acetotoluide, acrylamide, methacrylamide, amide acetate, amide stearate, and benzamide; imides, such as succinimide, phthalimide, and maleimide; amines, such as diphenylamine, phenylnaphthylamine, xylidine, N-phenylxylidine, carbazole, aniline, naphthylamine, butylamine, dibutylamine, and butylphenylamine; imidazoles, such as imidazole and 2-ethylimidazole; ureas, such as urea, thiourea, ethylene urea, ethylenethiourea, and diphenylurea; carbamic acid esters, such as phenyl N-phenylcarbamate; imines, such as ethyleneimine and propyleneimine; sulfites, such as sodium bisulfite and potassium bisulfite; and azole-based compounds. Examples of azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

Blocking (reacting with a blocking agent) can be performed by optionally adding a solvent. The solvent for use in blocking reaction is preferably not reactive with isocyanate groups. Examples of solvents include ketones, such as acetone and methyl ethyl ketone; esters, such as ethyl acetate; and N-methyl-2-pyrrolidone (NMP).

The polyisocyanate compounds may be used singly, or in a combination of two or more.

The polyisocyanate compounds can be used singly, or in a combination or two or more. In the present invention, the equivalent ratio of the hydroxyl groups in the hydroxy-containing resin to the isocyanate groups in the polyisocyanate compound (OH/NCO) is preferably 0.5 to 2.0, and more preferably 0.8 to 1.5, from the standpoint of, for example, curability and scratch resistance of the coating film.

When a two-component clear paint containing a hydroxy-containing resin and a polyisocyanate compound is used as a clear paint, the hydroxy-containing resin and the polyisocyanate compound are preferably separate, from the standpoint of storage stability; they are mixed and prepared into a two-component paint immediately before use.

The clear paint for use may be a one-component paint. The combination of the base resin and the curing agent in such a one-component paint includes a combination of a carboxy-containing resin and an epoxy-containing resin, a combination of a hydroxy-containing resin and a blocked polyisocyanate compound, and a combination of a hydroxy-containing resin and a melamine resin.

The clear paint may further optionally contain additives, such as a solvent (e.g., water and an organic solvent), a curing catalyst, an antifoaming agent, and an ultraviolet absorber.

The clear paint may suitably contain a color pigment in such an amount that transparency is not impaired. The color pigment may be a single pigment known for use in ink or paints, or a combination of two or more of such pigments. Although the amount of the color pigment can be suitably determined, the amount of the color pigment is 30 parts by mass or less, and preferably 0.01 to 10 parts by mass, per 100 parts by mass of the vehicle-forming resin composition in the clear paint.

The form of the clear paint is not particularly limited. The clear paint for use is typically an organic solvent-based paint composition. Examples of organic solvents for use in this case include various organic solvents for paints, such as aromatic or aliphatic hydrocarbon solvents, ester solvents, ketone solvents, and ether solvents. The organic solvent for use may be the solvent used in the preparation of, for example, the hydroxy-containing resin; or other organic solvents may be further added.

The clear paint has a solids concentration of preferably about 30 to 70 mass %, and more preferably about 40 to 60 mass %.

The clear paint is applied to the effect coating film. The method for applying the clear paint is not particularly limited, and the clear paint can be applied by the same method as that for the colored paint. For example, the clear paint can be applied by a coating method, such as air spray coating, airless spray coating, rotary-atomization coating, or curtain coating. In these coating methods, electrostatic charges may optionally be applied. Of these methods, rotary-atomization coating using electrostatic charges is preferable. Typically, the amount of the applied clear paint is preferably an amount that results in a cured film thickness of about 10 to 50 µm.

Moreover, when the clear paint is applied, it is preferable to suitably adjust the viscosity of the clear paint to fall within a viscosity range suitable for the coating method. For example, for rotary-atomization coating using electrostatic charges, it is preferable to suitably adjust the viscosity of the clear paint using a solvent, such as an organic solvent, so as to fall within a range of about 15 to 60 seconds as measured with a Ford cup No. 4 viscometer at 20° C.

In the method for forming a multilayer coating film according to one embodiment of the present invention, an uncured colored coating film, an uncured effect coating film, and an uncured clear coating film can be simultaneously cured by heating these three coating films. Heating can be performed by a known means. For example, a drying furnace, such as a hot air furnace, an electric furnace, or an infrared induction heating furnace, can be used. A suitable heating temperature is within the range of 70 to 150° C., and preferably 80 to 140° C. The heating time is not particularly limited; and is preferably 10 to 40 minutes, and more preferably 20 to 30 minutes.

The present invention includes a multilayer coating film that contains a colored coating film formed from a colored paint; an effect coating film that is formed from an effect pigment dispersion, and that is formed on the colored coating film; and a clear coating film that is formed from a clear paint, and that is formed on the effect coating film. The colored paint, effect pigment dispersion, clear paint, and method for forming a multilayer coating film are as described above. The three uncured coating films, which are a colored coating film, an effect coating film, and a clear coating film, can be cured simultaneously by heating. Alternatively, after a colored coating film is formed and cured, a base coating film, an effect coating film, and a clear coating film can be formed on the cured colored coating film; and then these three uncured coating films can be cured simultaneously by heating.

60-Degree Specular Gloss (60 Degree)

The effect pigment dispersion according to the present invention is applied to a colored coating film or to a base coating film that is stacked on a colored coating film, so as to give a thickness of 0.1 to 4 µm on a dry film basis, thereby forming an effect coating film; and a clear coating film is further formed on the effect coating film, thereby forming a multilayer coating film, which has a 60-degree specular gloss of preferably 90 to 240, more preferably 90 to 220, and still more preferably 90 to 200.

The present invention determines the 60-degree specular gloss of a multilayer coating film prepared by further stacking a clear coating film on an effect coating film prepared so as to give a thickness of 0.1 to 4 µm on a dry coating film basis. However, this does not mean that the 60-degree specular gloss is always within the above ranges when the thickness of the effect coating film is any value within the range of 0.1 to 4 µm; rather, this means that the 60-degree specular gloss is within the above ranges, while the thickness of the effect coating film is a value within the range of 0.1 to 4 µm.

The specular gloss refers to a ratio of specular reflection from the surface of an object to specular reflection light from a reference surface (glass with a refractive index of 1.567), and is a value defined by JIS-Z8741. Specifically, specular gloss is determined in the following manner: a luminous flux of a predetermined aperture angle is allowed to enter the surface of a measurement sample at a predetermined incident angle, and a luminous flux of a predetermined aperture angle reflected in the direction of specular reflection is measured with an optical receiver; i.e., specular gloss is a value measured with a "glossmeter." In the present specification, the specular gloss is defined as a 60-degree specular gloss (60 degree) measured with a glossmeter (micro-TRI-gloss, produced by BYK-Gardner). A greater value of the 60-degree specular gloss indicates a higher gloss of the coating film.

In an embodiment, a multilayer coating film prepared as described below has a 60-degree specular gloss of preferably 130 to 240, more preferably 135 to 235, and still more preferably 140 to 230, from the standpoint of the denseness of the metallic coating film: the multilayer coating film is prepared by applying the effect pigment dispersion according to the present invention containing a vapor deposition metal flake pigment as a flake-effect pigment dispersion (B) to a colored coating film to give a thickness of 0.1 to 4 μm on a dry film basis, in order to form an effect coating film of the effect pigment dispersion; and further forming a transparent clear coating film thereon.

Graininess

The present invention determines the HG value of a multilayer coating film prepared by further stacking a clear coating film on an effect coating film prepared so as to give a thickness of 0.1 to 4 μm on a dry coating film basis.

In an embodiment, a multilayer coating film prepared as described below has an HG value of preferably 10 to 55, more preferably 10 to 50, and still more preferably 10 to 48, from the standpoint of the denseness of the metallic coating film. The multilayer coating film is prepared by applying the effect pigment dispersion according to the present invention containing a vapor deposition metal flake pigment and/or an aluminum flake pigment as a flake-effect pigment dispersion (B) to a colored coating film to give a thickness of 0.1 to 4 μm on a dry film basis, in order to form an effect coating film of the effect pigment dispersion; and further forming a transparent clear coating film thereon.

In another embodiment, a multilayer coating film prepared as described below has an HG value of preferably 10 to 65, more preferably 10 to 63, and still more preferably 10 to 60, from the standpoint of the denseness of the metallic coating film. The multilayer coating film is prepared by applying the effect pigment dispersion according to the present invention containing an interference pigment as a flake-effect pigment dispersion (B) to a colored coating film to give a thickness of 0.1 to 4 μm on a dry film basis, in order to form an effect coating film of the effect pigment dispersion; and further forming a transparent clear coating film thereon.

The HG value is not determined as being always within the ranges described above when the thickness of the effect coating film is any value within the range of 0.1 to 4 μm; rather, the HG value is determined as being within the above ranges, while the thickness of the effect coating film is a value within the range of 0.1 to 4 μm.

The graininess is indicated by a hi-light graininess value (abbreviated as "HG value" below). The HG value is a parameter of microscopic brilliance, which is a texture, obtained by microscopic observation, and indicates the graininess in the highlight (observation of a coating film from near the specular reflection light with respect to incident light). The HG value is calculated as follows. First, the coating film is photographed with a CCD camera at a light incidence angle of 15° and a receiving angle of 0°, and the obtained digital image data (i.e., two-dimensional brilliance distribution data) is subjected to a two-dimensional Fourier transform to obtain a power spectrum image. Subsequently, only the spatial frequency area that corresponds to graininess is extracted from the power spectrum image, and the obtained measurement parameter is converted to an HG value from 0 to 100 so as to have a linear relation with graininess. Specifically, the HG value can be measured with a microscopic brilliance-measuring device. The details of the measurement method are found in Research on Coatings (Kansai Paint Technical Report), No. 138, August 2002, pp. 8 to 24; and in Research on Coatings (Kansai Paint Technical Report), No. 132, August 2002, pp. 8 to 24. A lower HG value of graininess indicates less graininess on the surface of the coating film.

The present invention can also employ the following configurations.

[1] An effect pigment dispersion comprising
water,
a wetting agent (A),
a flake-effect pigment (B), and
cellulose nanofibers (C),
the cellulose nanofibers (C) having a carboxyl group amount of 0.4 to 1.0 mmol/g based on the absolute dry mass of the cellulose nanofibers and having a transparency of 80% or more in a 1.0 mass % aqueous dispersion of the cellulose nanofibers,
the effect pigment dispersion having a solids content of 0.1 to 10 parts by mass, per 100 parts by mass of all of the components of the effect pigment dispersion,
the effect pigment dispersion having a viscosity of 100 to 10000 mPa·sec as measured with a Brookfield viscometer at a rotational speed of 6 revolutions per minute.

[2] The effect pigment dispersion according to [1], wherein the wetting agent (A) is present, on a solids basis, in an amount of 4 to 400 parts by mass, per 100 parts by mass of the solids content of the flake-effect pigment (B).

[3] The effect pigment dispersion according to [1] or [2], wherein the flake-effect pigment (B) is present, on a solids basis, in an amount of 2 to 97 parts by mass, per 100 parts by mass of the solids content of the effect pigment dispersion.

[4] The effect pigment dispersion according to any one of [1] to [3], further comprising an aqueous resin dispersion.

[5] The effect pigment dispersion according to any one of [1] to [4], wherein the viscosity change (%) of the effect pigment dispersion at a shear rate of 0.1 ($s^{-1}$) represented by the following formula is less than 60%:

$$\text{Viscosity change (\%) at a shear rate of 0.1 } (s^{-1}) = \\ ((\text{viscosity before stirring-viscosity after stirring})/\text{viscosity before stirring}) \times 100$$

[6] The effect pigment dispersion according to any one of [1] to [5], wherein the wetting agent (A) comprises a silicone-based wetting agent, an acrylic-based wetting agent, a vinyl-based wetting agent, a fluorine-based wetting agent, an acetylene diol-based wetting agent, or a combination thereof.

[7] The effect pigment dispersion according to any one of [1] to [6], wherein in the effect pigment dispersion, the wetting agent (A) is preferably present, on a solids basis, in an amount of 0.01 to 20 parts by mass, per 100 parts by mass of the solids content of the effect pigment dispersion.

[8] The effect pigment dispersion according to any one of [1] to [7], wherein the flake-effect pigment (B) comprises a vapor deposition metal flake pigment, an aluminum flake pigment, an interference pigment, or a combination thereof.

[9] The effect pigment dispersion according to any one of [1] to [8], wherein the flake-effect pigment (B) is present, on a solids basis, in an amount of 2 to 97 mass %, per 100 parts by mass of the total solids content of the effect pigment dispersion.

[10] The effect pigment dispersion according to any one of [1] to [9], wherein the solids concentration of oxidized cellulose in the effect pigment dispersion is 0.1 mass % or more and 10 mass % or less.

[11] A method for forming a multilayer coating film, comprising
applying a colored paint to a substrate to form a colored coating film,
applying the effect pigment dispersion of any one of [1] to [10] to the formed colored coating film to form an effect coating film, and
applying a clear paint to the formed effect coating film to form a clear coating film.

[12] The method for forming a multilayer coating film according to [11], wherein the effect coating film has a thickness of 0.1 to 4 μm on a dry film basis.

[13] The method for forming a multilayer coating film according to [11] or [12], wherein the multilayer coating film has a 60-degree specular gloss of 90 to 240.

[14] The method for forming a multilayer coating film according to any one of [11] or [13], wherein the flake-effect pigment (B) comprises a vapor deposition metal flake pigment and/or an aluminum flake pigment, and the multilayer coating film has a graininess HG of 55 or less.

[15] The method for forming a multilayer coating film according to any one of [11] or [13], wherein the flake-effect pigment (B) comprises an interference pigment, and the multilayer coating film has a graininess HG of 65 or less.

[16] A multilayer coating film comprising
a colored coating film formed from a colored paint,
an effect coating film that is formed from the effect pigment dispersion of any one of [1] to [10] and that is formed on the colored coating film, and
a clear coating film that is formed from a clear paint and that is formed on the effect coating film.

[17] The multilayer coating film according to [16], wherein the effect coating film has a thickness of 0.1 to 4 μm on a dry film basis.

[18] The multilayer coating film according to [16] or [17], which has a 60-degree specular gloss of 90 to 240.

[19] The multilayer coating film according to any one of [16] to [18], wherein the flake-effect pigment (B) comprises a vapor deposition metal flake pigment and/or an aluminum flake pigment, and the multilayer coating film has a graininess HG of 55 or less.

[20] A method for forming the multilayer coating film according to any one of [16] to [18], wherein the flake-effect pigment (B) comprises an interference pigment, and the multilayer coating film has a graininess HG of 65 or less.

EXAMPLES

The present invention is described below more specifically with reference to Examples and Comparative Examples. However, the present invention is not limited thereto or thereby. The parts and percentages referred to herein are by mass unless otherwise specified.

Production of Hydroxy-Containing Acrylic Resin (R-1)

Production Example 1

35 parts of propylene glycol monopropyl ether was placed in a reaction vessel equipped with a thermometer, a thermostat, a stirrer, a reflux condenser, a nitrogen inlet tube, and a dropping funnel; and heated to 85° C. A mixture of 32 parts of methyl methacrylate, 27.7 parts of n-butyl acrylate, 20 parts of 2-ethylhexyl acrylate, 10 parts of 4-hydroxybutyl acrylate, 3 parts of hydroxypropyl acrylate, 6.3 parts of acrylic acid, 1 part of 2-acryloyloxyethyl acid phosphate, 15 parts of propylene glycol monopropyl ether, and 2.3 parts of 2,2'-azobis(2,4-dimethylvaleronitrile) was added dropwise over 4 hours. After the completion of dropwise addition, the mixture was aged for 1 hour. Thereafter, a mixture of 10 parts of propylene glycol monopropyl ether and 1 part of 2,2'-azobis(2,4-dimethylvaleronitrile) was further added dropwise over 1 hour. After the completion of dropwise addition, the mixture was aged for 1 hour. 7.4 parts of diethanolamine was further added, thereby obtaining a hydroxy-containing acrylic resin (R-1) solution with a solids content of 55%. The obtained hydroxy-containing acrylic resin (R-1) had an acid value of 51 mg KOH/g, and a hydroxy value of 52 mg KOH/g.

Production of Red Pigment Dispersion (P-1)

Production Example 2

60 parts of the hydroxy-containing acrylic resin (R-1) (solids content: 33 parts), 35 parts of Paliogen Maroon L3920 (trade name, a perylene red pigment, produced by BASF A.G.), and 177 parts of deionized water were placed in a stirring vessel. After these components were homogeneously mixed, 2-(dimethylamino)ethanol was further added to adjust the pH to 7.5. The obtained mixture was placed in a 300-ml resin bottle, and 130 parts of zirconia beads (diameter: 1.5 mm) were added thereto, followed by hermetically sealing the bottle. The mixture was dispersed for 120 minutes using a paint shaker conditioner. After the dispersion, the zirconia beads were removed by filtration through a 100-mesh metallic gauze, thus obtaining a red pigment dispersion (P-1) with a solids content of 25%.

Production of Orange Pigment Dispersion (P-2)

Production Example 3

70.9 parts of the hydroxy-containing acrylic resin (R-1) (solids content: 39 parts), 39 parts of Cosmoray Orange L2950 (trade name, a diketopyrrolopyrrole orange pigment, produced by BASF), and 241.45 parts of deionized water were placed in a stirring vessel. After these components were homogenousiy mixed, 2-(dimethylamino)ethanol was further added to adjust the pH to 7.5. The obtained mixture was placed in a 300-ml resin bottle, and 130 parts of zirconia beads (diameter: 1.5 mm) were added thereto, followed by hermetically sealing the bottle. The mixture was dispersed for 120 minutes using a paint shaker conditioner. After the dispersion, the zirconia beads were removed by filtration through 100-mesh metallic gauze, thus obtaining an orange pigment dispersion (P-2) with a solids content of 22.2%.

Production of Extender Pigment Dispersion (P-3)

Production Example 4

327 parts of the acrylic resin solution (R-1) (solids content: 180 parts), 360 parts of deionized water, 6 parts of Surfynol 104A (trade name, produced by Evonik Industries AG, an antifoaming agent, solids content: 50%), and 250 parts of Barifine BF-20 (trade name, produced by Sakai Chemical Industry Co., Ltd., barium sulfate powder, average particle size: 0.03 μm) were placed in a paint conditioner, and a glass bead medium was added thereto. The mixture was mixed and dispersed at room temperature for 1 hour, thus obtaining an extender pigment dispersion (P-3) with a solids content of 44%.

Production of Aqueous Acrylic Resin Dispersion (R-2)

Production Example 5

128 parts of deionized water and 2 parts of Adekaria Soap SR-1025 (trade name, produced by Adeka Corporation, an emulsifier, active ingredient: 25%) were placed in a reaction vessel equipped with a thermometer, a thermostat, a stirrer, a reflux condenser, a nitrogen inlet tube, and a dropping funnel. The mixture was stirred and mixed in a nitrogen flow, and heated to 80° C.

Subsequently, 1% of the entire amount of a monomer emulsion for the core portion, which is described below, and 5.3 parts of a 6% ammonium persulfate aqueous solution were introduced into the reaction vessel, and maintained therein at 80° C. for 15 minutes. Thereafter, the remaining monomer emulsion for the core portion was added dropwise over a period of 3 hours to the reaction vessel maintained at the same temperature. After completion of the dropwise addition, the mixture was aged for 1 hour. Subsequently, a monomer emulsion for the shell portion, which is described below, was added dropwise over a period of 1 hour. After aging for 1 hour, the mixture was cooled to 30° C. while gradually adding 40 parts of a 5% 2-(dimethylamino)ethanol aqueous solution to the reaction vessel; and filtered through a 100-mesh nylon cloth, thereby obtaining an aqueous acrylic resin dispersion (R-2) having an average particle size of 100 nm and a solids content of 30%. The obtained aqueous acrylic resin dispersion had an acid value of 33 mg KOH/g, and a hydroxy value of 25 mg KOH/g.

Monomer emulsion for the core portion: the monomer emulsion for the core portion was obtained by mixing and stirring 40 parts of deionized water, 2.8 parts of Adeka Reasoap SR-1025, 2.1 parts of methylene bisacrylamide, 2.8 parts of styrene, 16.1 parts of methyl methacrylate, 28 parts of ethyl acrylate, and 21 parts of n-butyl acrylate.

Monomer emulsion for the shell portion: the monomer emulsion for the shell portion was obtained by mixing and stirring 17 parts of deionized water, 1.2 parts of Adeka Reasoap SR-1025, 0.03 parts of ammonium persulfate, 3 parts of styrene, 5.1 parts of 2-hydroxyethyl acrylate, 5.1 parts of methacrylic acid, 6 parts of methyl methacrylate, 1.8 parts of ethyl acrylate, and 9 parts of n-butyl acrylate.

Production of Aqueous Polyester Resin Dispersion (R-3)

Production Example 6

664 parts of isophthalic acid, 496 parts of adipic acid, 237 parts of phthalic anhydride, 788 parts of neopentyl glycol, and 341 parts of trimethylolpropane were placed in a reaction vessel equipped with a stirrer, a thermometer, a device for removing reaction-generated water, and a nitrogen gas inlet tube; and heated to 160° C. with stirring in a nitrogen gas atmosphere. After the temperature was maintained at 160° C. for 1 hour, the generated condensed water was removed, and the temperature was raised to 230° C. over a period of 5 hours; and the temperature was kept at the same temperature. When the acid value had reached 7 mg KOH/g, the mixture was cooled to 170° C., 490 parts of ε-caprolactone was added, and the mixture was kept at the same temperature for 1 hour. 77 parts of trimellitic anhydride was then added to this reaction product, and an addition reaction was performed at 170° C. for 30 minutes. The mixture was then cooled to 50° C. or less, and 0.88 equivalents of 2-(dimethylamino)ethanol was added to the acid group for neutralization. Deionized water was then gradually added to obtain a hydroxy-containing polyester resin (R-3) having a solids concentration of 40% and a pH of 7.5. The obtained hydroxy-containing polyester resin had a lactone modification amount of 18 mass %, a number average molecular weight of 2074, a hydroxyl value of 89 mg KOH/g, and an acid value of 23 mg KOH/g.

Production of Polyester Resin Solution (R-4)

Production Example 7

109 parts of trimethyloipropane, 141 parts of 1,6-hexanediol, 126 parts of 1,2-cyclohexanedicarboxylic anhydride, and 120 parts of adipic acid were placed in a reaction vessel equipped with a thermometer, a thermostat, a stirrer, a reflux condenser, and a water separator. The mixture was heated from 160° C. to 230° C. over a period of 3 hours, followed by a condensation reaction at 230° C. for 4 hours. Subsequently, to introduce a carboxyl group to the obtained condensation reaction product, 38.3 parts of trimellitic anhydride was added to the obtained condensation reaction product, and a reaction was allowed to proceed at 170° C. for 30 minutes. The reaction product was then diluted with 2-ethyl-1-hexanol, thus obtaining a polyester resin solution (R-4) with a solids content of 70%. The obtained hydroxy-containing polyester resin had an acid value of 46 mg KOH/g, a hydroxy value of 150 mg KOH/g, and a number average molecular weight of 1400.

Production of Transparent Base Paint (X-1)

Production Example 8

In a stirring vessel, 14 parts (on a solids basis) of the extender pigment dispersion (P-3), 40 parts (on a solids basis) of the aqueous acrylic resin dispersion (R-2), 23 parts (on a solids basis) of the polyester resin solution (R-4), 10 parts (on a solids basis) of U-Coat UX-310 (trade name, produced by Sanyo Chemical Industries, Ltd., an aqueous urethane resin dispersion, solids content: 40%), and 27 parts (on a solids basis) of Cymel 251 (trade name, produced by Nihon Cytec Industries Inc., a melamine resin, solids content: 80%) were stirred and mixed, thus preparing a transparent base paint (X-1).

Production of Transparent Base Paint (X-2)

Production Example 9

15 parts of Xirallic T60-10 Crystal Silver was mixed with 100 parts by mass of the resin solids content in the transparent base paint (X-1) to produce a transparent base paint (X-2).

Preparation of Cellulose Nanofibers (C)

Production Example 10

5.00 g (absolute dry weight) of unrefined bleached softwood kraft pulp (whiteness: 85%) was added to 500 mL of an aqueous solution in which 20 mg of TEMPO (Sigma Aldrich) (0.025 mmol per gram of absolutely dry cellulose) and 514 mg of sodium bromide (1.0 mmol per gram of absolutely dry cellulose) were dissolved, and the mixture was stirred until the pulp was homogeneously dispersed. An aqueous sodium hypochlorite solution was added to the reaction system so that the sodium hypochlorite concentration was 2.2 mmol/g to initiate an oxidation reaction. Since the pH in the system decreased during the reaction, a 3M aqueous sodium hydroxide solution was added successively to adjust the pH to 10. The reaction was terminated when the sodium hypochlorite was consumed, and a change in the pH in the reaction system was stopped. After the reaction, the mixture was filtered through a glass filter to separate the pulp, and the pulp was sufficiently washed with water to obtain oxidized pulp (carboxylated cellulose). The yield of pulp at this time was 93%, the time required for completion of the oxidation reaction was 60 minutes, and the amount of carboxyl groups was 0.72 mmol/g. The resulting product was adjusted to 1.4% (w/v) with water, and defibration treatment was performed until the transparency was sufficiently high by using a high-pressure homogenizer, thereby obtaining an oxidized cellulose nanofiber (C-1) aqueous dispersion having a transparency of 93.7% (1% (w/v)). This aqueous dispersion of cellulose nanofibers had a viscosity of 1000 mPa·sec as measured with a Brookfield viscometer at 60 rpm.

Production Example 11

5.00 g (absolute dry weight) of unrefined bleached softwood kraft pulp (whiteness: 85%) was added to 500 mL of an aqueous solution in which 20 mg of TEMPO (Sigma Aldrich) (0.025 mmol per gram of absolutely dry cellulose) and 514 mg of sodium bromide (1.0 mmol per gram of absolutely dry cellulose) were dissolved, and the mixture was stirred until the pulp was homogeneously dispersed. An aqueous sodium hypochlorite solution was added to the reaction system so that the sodium hypochlorite concentration was 1.8 mmol/g to initiate an oxidation reaction. Since the pH in the system decreased during the reaction, a 3M aqueous sodium hydroxide solution was added successively to adjust the pH to 10. The reaction was terminated when the sodium hypochlorite was consumed, and a change in the pH in the reaction system was stopped. After the reaction, the mixture was filtered through a glass filter to separate the pulp, and the pulp was sufficiently washed with water to obtain oxidized pulp (carboxylated cellulose). The yield of pulp at this time was 93%, the time required for completion of the oxidation reaction was 60 minutes, and the amount of carboxyl groups was 0.58 mmol/g. The resulting product was adjusted to 1.1% (w/v) with water, and defibration treatment was performed until the transparency was sufficiently high by using a high-pressure homogenizer, thereby obtaining an oxidized cellulose nanofiber (0-2) aqueous dispersion having a transparency of 90.2% (1% (w/v)). This aqueous dispersion of cellulose nanofibers had a viscosity of 1000 mPa·sec as measured with a Brookfield viscometer at 60 rpm.

Production Example 12

5.00 g (absolute dry weight) of unrefined bleached softwood kraft pulp (whiteness: 85%) was added to 500 mL of an aqueous solution in which 20 mg of TEMPO (Sigma Aldrich) (0.025 mmol per gram of absolutely dry cellulose) and 514 mg of sodium bromide (1.0 mmol per gram of absolutely dry cellulose) were dissolved, and the mixture was stirred until the pulp was homogeneously dispersed. An aqueous sodium hypochlorite solution was added to the reaction system so that the sodium hypochlorite concentration was 2.2 mmol/g to initiate an oxidation reaction. Since the pH in the system decreased during the reaction, a 3M aqueous sodium hydroxide solution was added successively to adjust the pH to 10. The reaction was terminated when the sodium hypochlorite was consumed, and a change in the pH in the reaction system was stopped. After the reaction, the mixture was filtered through a glass filter to separate the pulp, and the pulp was sufficiently washed with water to obtain oxidized pulp (carboxylated cellulose). The yield of pulp at this time was 93.9%, the time required for completion of the oxidation reaction was 60 minutes, and the amount of carboxyl groups was 0.9 mmol/g. The resulting product was adjusted to 1.0% (w/v) with water, and defibration treatment was performed until the transparency was sufficiently high by using a high-pressure homogenizer, thereby obtaining an oxidized cellulose nanofiber (0-3) aqueous dispersion having a transparency of 93.7% (1% (w/v)). This aqueous dispersion of cellulose nanofibers had a viscosity of 1500 mPa·sec as measured with a Brookfield viscometer at 60 rpm.

Production Example 13

5.00 g (absolute dry weight) of unrefined bleached softwood kraft pulp (whiteness: 85%) was added to 500 mL of an aqueous solution in which 20 mg of TEMPO (Sigma Aldrich) (0.025 mmol per gram of absolutely dry cellulose) and 514 mg of sodium bromide (1.0 mmol per gram of absolutely dry cellulose) were dissolved, and the mixture was stirred until the pulp was homogeneously dispersed. An aqueous sodium hypochlorite solution was added to the reaction system so that the sodium hypochlorite concentration was 2.2 mmol/g to initiate an oxidation reaction. Since the pH in the system decreased during the reaction, a 3M aqueous sodium hydroxide solution was added successively to adjust the pH to 10. The reaction was terminated when the sodium hypochlorite was consumed, and a change in the pH in the reaction system was stopped. After the reaction, the mixture was filtered through a glass filter to separate the pulp, and the pulp was sufficiently washed with water to obtain oxidized pulp (carboxylated cellulose). The yield of pulp at this time was 93%, the time required for completion of the oxidation reaction was 60 minutes, and the amount of carboxyl groups was 0.68 mmol/g. The resulting product was adjusted to 1.4% (w/v) with water, and defibration treatment was performed until the transparency was sufficiently high by using a high-pressure homogenizer, thereby obtaining an oxidized cellulose nanofiber (C-4) aqueous dispersion having a transparency of 89.8% (1% (w/v)). This aqueous dispersion of cellulose nanofibers had a viscosity of 2300 mPa·sec as measured with a Brookfield viscometer at 60 rpm.

Production Example 14

5.00 g (absolute dry weight) of unrefined bleached softwood kraft pulp (whiteness: 85%) was added to 500 mL of an aqueous solution in which 39 mg of TEMPO (Sigma Aldrich) (0.05 mmol per gram of absolutely dry cellulose) and 514 mg of sodium bromide (1.0 mmol per gram of absolutely dry cellulose) were dissolved, and the mixture was stirred until the pulp was homogeneously dispersed. An aqueous sodium hypochlorite solution was added to the reaction system so that the sodium hypochlorite concentration was 6.0 mmol/g to initiate an oxidation reaction. Since the pH in the system decreased during the reaction, a 3M aqueous sodium hydroxide solution was added successively to adjust the pH to 10. The reaction was terminated when the sodium hypochlorite was consumed, and a change in the pH in the reaction system was stopped. After the reaction, the mixture was filtered through a glass filter to separate the pulp, and the pulp was sufficiently washed with water to obtain oxidized pulp (carboxylated cellulose). The yield of pulp at this time was 90%, the time required for completion of the oxidation reaction was 90 minutes, and the amount of carboxyl groups was 1.53 mmol/g. The resulting product was adjusted to 1.0% (w/v) with water, and defibration treatment was performed until the transparency was sufficiently high by using a high-pressure homogenizer, thereby obtaining an oxidized cellulose nanofiber (O-5) aqueous dispersion having a transparency of 95.1% (1% (w/v)). This aqueous dispersion of cellulose nanofibers had a viscosity of 2000 mPa·sec as measured with a Brookfield viscometer at 60 rpm.

Production Example 15

5.00 g (absolute dry weight) of unrefined bleached softwood kraft pulp (whiteness: 85%) was added to 500 mL of an aqueous solution in which 39 mg of TEMPO (Sigma Aldrich) (0.05 mmol per gram of absolutely dry cellulose) and 514 mg of sodium bromide (1.0 mmol per gram of absolutely dry cellulose) were dissolved, and the mixture was stirred until the pulp was homogeneously dispersed. An aqueous sodium hypochlorite solution was added to the reaction system so that the sodium hypochlorite concentration was 3.0 mmol/g to initiate an oxidation reaction. Since the pH in the system decreased during the reaction, a 3M aqueous sodium hydroxide solution was added successively to adjust the pH to 10. The reaction was terminated when the sodium hypochlorite was consumed, and a change in the pH in the reaction system was stopped. After the reaction, the mixture was filtered through a glass filter to separate the pulp, and the pulp was sufficiently washed with water to obtain oxidized pulp (carboxylated cellulose). The yield of pulp at this time was 90%, the time required for completion of the oxidation reaction was 90 minutes, and the amount of carboxyl groups was 1.08 mmol/g. The resulting product was adjusted to 1.0% (w/v) with water, and defibration treatment was performed until the transparency was sufficiently high by using a high-pressure homogenizer, thereby obtaining an oxidized cellulose nanofiber (O-6) aqueous dispersion having a transparency of 95.1% (1% (w/v)). This aqueous dispersion of cellulose nanofibers had a viscosity of 1100 mPa·sec as measured with a Brookfield viscometer at 60 rpm.

Production Example 16

5.00 g (absolute dry weight) of unrefined bleached softwood kraft pulp (whiteness: 85%) was added to 500 mL of an aqueous solution in which 39 mg of TEMPO (Sigma Aldrich) (0.05 mmol per gram of absolutely dry cellulose) and 514 mg of sodium bromide (1.0 mmol per gram of absolutely dry cellulose) were dissolved, and the mixture was stirred until the pulp was homogeneously dispersed. An aqueous sodium hypochlorite solution was added to the reaction system so that the sodium hypochlorite concentration was 1.8 mmol/g to initiate an oxidation reaction. Since the pH in the system decreased during the reaction, a 3M aqueous sodium hydroxide solution was added successively to adjust the pH to 10. The reaction was terminated when the sodium hypochlorite was consumed, and a change in the pH in the reaction system was stopped. After the reaction, the mixture was filtered through a glass filter to separate the pulp, and the pulp was sufficiently washed with water to obtain oxidized pulp (carboxylated cellulose). The yield of pulp at this time was 90%, the time required for completion of the oxidation reaction was 60 minutes, and the amount of carboxyl groups was 0.58 mmol/g. The resulting product was adjusted to 1.1% (w/v) with water, and defibration treatment was performed until the transparency was sufficiently high by using a high-pressure homogenizer, thereby obtaining an oxidized cellulose nanofiber (O-7) aqueous dispersion having a transparency of 77.4% (1% (w/v)). This aqueous dispersion of cellulose nanofibers had a viscosity of 2400 mPa·sec as measured with a Brookfield viscometer at 60 rpm.

Preparation of Effect Pigment Dispersion

Example 1

An effect pigment dispersion (Y-1) was prepared by placing the following components in a stirring vessel to achieve the following proportions, and mixing with stirring: 76.7 parts of distilled water, 0.25 parts (on a solids basis) of Dynol 604 (trade name, an acetylenic diol wetting agent, produced by Evonik Industries, with ethylene oxide chains, solids content: 100%), 1.2 parts (on a solids basis) of Hydroshine WS-3001 (trade name, an aqueous vapor deposition aluminum flake pigment, produced by Eckart, solids content: 10%, internal solvent: isopropanol, average particle size D50: 13 μm, thickness: 0.05 μm; surface-treated with silica), 0.37 parts (on a solids basis) cf Alpaste EMR-B6360 (trade name, produced by Toyo Aluminium K.K., a non-leafing aluminum flake, average particle size D50: 10.3 μm, thickness: 0.19 μm; surface-treated with silica), 0.5 parts (on a solids basis) of the cellulose nanofiber (C-1) aqueous dispersion, 0.14 parts (on a solids basis) of Tinuvin 479-DW (trade name, an UV absorber, produced by BASF, a hydroxyphenyltriazine UV absorber; HPT UV absorber Tinuvin 479 is included in an acrylic polymer, solids content: 40%), 0.11 parts (on a solids basis) of Tinuvin 123-DW (trade name, a light stabilizer, produced by BASF, decanedioate bis(2,2,6,6-tetramethyl-1-(octyloxy)-4-piperidinyl) ester; HALS Tinuvin 123 having an amino ether group is included in an acrylic polymer, solids content: 50%), 0.67 parts (on a solids basis) of the aqueous acrylic resin dispersion (R-2), 19.5 parts of isopropanol, and 0.51 parts of octanol.

Examples 2 to 28 and Comparative Examples 1 to 10

Effect pigment dispersions (Y-2) to (Y-38) were obtained in the same manner as in Example 1, except that the formulations shown in Table 1 were used.

In Table 1, the numerical values for distilled water and solvents indicate the liquid amount; and the numerical values for the others indicate the solids content.

The following are components shown in Table 1.

TEGO Twin 4100: trade name, a silicone-based wetting agent, produced by Evonik Degussa, with ethylene oxide chains, solids content: 100%;

BYK-348: trade name, BYE, a silicone-based wetting agent, produced by BYE, with ethylene oxide chains, solids content: 100%;

Surfynol 420: trade name, produced by Evonik Industries, an acetylenic diol wetting agent, with ethylene oxide chains, solids content: 100%;

Surfynol 440: trade name, produced by Evonik Industries, an acetylenic diol wetting agent, with ethylene oxide chains, solids content: 100%;

Surfynol 460: trade name, produced by Evonik Industries, an acetylenic diol wetting agent, with ethylene oxide chains, solids content: 100%;

Surfynol 104A: trade name, produced by Evonik Industries, an acetylenic dial wetting agent, with no ethylene oxide chain, solids content: 50%;

Metalure Liquid Black: trade name, an aqueous physical vapor deposition chrome flake pigment, produced by Eckart, solids content: 10%, internal solvent: propylene glycol monomethyl ether, average particle size D50: 14 µm, thickness: 0.02 µm;

Xirallic T61-10 Micro Silver: trade name, a titanium oxide-coated alumina flake pigment, produced by Merck & Co., Inc., average primary particle size: about 12 µm, average thickness: about 0.3 µm);

Xirallic T60-10 Crystal Silver: trade name, a titanium oxide-coated alumina flake pigment, produced by Merck & Co., Inc., average primary particle size: about 19 µm, average thickness: about 0.4 µm;

Pyrisma M40-58 SW Ambercup Orange: trade name, an iron oxide-coated mica pigment, produced by Merck & Co., Inc., primary average particle size: about 17.1 µm, average thickness: about 0.65 µm;

Acrysol ASE-60: trade name, produced by The Dow Chemical Company, a polyacrylic acid-based rheology control agent, solids content: 28%;

U-Coat UX-300: trade name, produced by Sanyo Chemical Industries, Ltd., an aqueous urethane resin dispersion.

TABLE 1

(Components other than water and solvents are expressed on a solids basis.)

| | | Example | | | | | | | |
|---|---|---|---|---|---|---|---|---|---|
| | | 1 | 2 | 3 | 4 | 5 | 6 | 7 | 8 |
| | Name of aqueous effect pigment dispersion | Y-1 | Y-2 | Y-3 | Y-4 | Y-5 | Y-6 | Y-7 | Y-8 |
| | Distilled water | 76.7 | 76.7 | 76.7 | 76.7 | 76.7 | 76.7 | 76.7 | 76.7 |
| Wetting agent (A) | Dynol 604 | 0.25 | | | | | | | 0.25 |
| | TEGO Twin 4100 | | 0.25 | | | | | | |
| | BYK-348 | | | 0.25 | | | | | |
| | Surfynol 420 | | | | 0.25 | | | | |
| | Surfynol 440 | | | | | 0.25 | | | |
| | Surfynol 460 | | | | | | 0.25 | | |
| | Surfynol 104A | | | | | | | 0.25 | |
| Effect pigment (B) | Hydroshine WS-3001 | 1.2 | 1.2 | 1.2 | 1.2 | 1.2 | 1.2 | 1.2 | 1.57 |
| | Alpaste EMR-B6360 | 0.37 | 0.37 | 0.37 | 0.37 | 0.37 | 0.37 | 0.37 | |
| | Metalure Liquid Black | | | | | | | | |
| | Xirallic T61-10 Micro Silver | | | | | | | | |
| | Xirallic T60-10 Crystal Silver | | | | | | | | |
| | Pyrisma M40-58 SW A. Orange | | | | | | | | |
| Cellulose nanofiber (C) | (C-1) | 0.5 | 0.5 | 0.5 | 0.5 | 0.5 | 0.5 | 0.5 | 0.5 |
| | (C-2) | | | | | | | | |
| | (C-3) | | | | | | | | |
| | (C-4) | | | | | | | | |
| | (C-5) | | | | | | | | |
| | (C-6) | | | | | | | | |
| | (C-7) | | | | | | | | |
| Color pigment dispersion | Red pigment dispersion (P-1) | | | | | | | | |
| | Orange pigment dispersion (P-2) | | | | | | | | |
| Rheology control agent | Acrysol ASE-60 | | | | | | | | |
| Ultraviolet absorber | Tinuvin 479-DW | 0.14 | 0.14 | 0.14 | 0.14 | 0.14 | 0.14 | 0.14 | 0.14 |
| Light stabilizer | Tinuvin 123-DW | 0.11 | 0.11 | 0.11 | 0.11 | 0.11 | 0.11 | 0.11 | 0.11 |
| Aqueous resin dispersion | Aqueous acrylic resin dispersion (R-2) | 0.67 | 0.67 | 0.67 | 0.67 | 0.67 | 0.67 | 0.67 | 0.67 |
| | U-Coat UX-300 | | | | | | | | |
| | Aqueous polyester resin dispersion (R-3) | | | | | | | | |
| Dispersion resin | Hydroxy-containing acrylic resin (R-1) | | | | | | | | |
| Solvent | Isopropanol | 19.5 | 19.5 | 19.5 | 19.5 | 19.5 | 19.5 | 19.5 | 19.5 |
| | Octanol | 0.51 | 0.51 | 0.51 | 0.51 | 0.51 | 0.51 | 0.51 | 0.51 |
| Aqueous effect pigment dispersion | Solids content (%) | 3.2 | 3.2 | 3.2 | 3.2 | 3.2 | 3.2 | 3.2 | 3.2 |
| | B6/mPa · s | 2300 | 2320 | 2400 | 2410 | 2500 | 2340 | 2340 | 2360 |
| | Viscosity stability | B | B | B | B | B | B | B | B |

| | | Example | | | | |
|---|---|---|---|---|---|---|
| | | 9 | 10 | 11 | 12 | 13 |
| | Name of aqueous effect pigment dispersion | Y-9 | Y-10 | Y-11 | Y-12 | Y-13 |
| | Distilled water | 76.7 | 75.2 | 84.93 | 84.93 | 94.6 |
| Wetting agent (A) | Dynol 604 | 0.25 | 0.25 | 0.29 | 0.29 | 0.24 |
| | TEGO Twin 4100 | | | | | |
| | BYK-348 | | | | | |
| | Surfynol 420 | | | | | |
| | Surfynol 440 | | | | | |
| | Surfynol 460 | | | | | |
| | Surfynol 104A | | | | | |
| Effect pigment (B) | Hydroshine WS-3001 | | | | | |
| | Alpaste EMR-B6360 | 1.57 | | | | |
| | Metalure Liquid Black | | 3.14 | | | |
| | Xirallic T61-10 Micro Silver | | | 2.74 | | |
| | Xirallic T60-10 Crystal Silver | | | | 2.74 | |
| | Pyrisma M40-58 SW A. Orange | | | | | 1.26 |

TABLE 1-continued (Components other than water and solvents are expressed on a solids basis.)

|  |  |  |  |  |  |  |
|---|---|---|---|---|---|---|
| Cellulose nanofiber (C) | (C-1) | 0.5 | 0.5 | 0.6 | 0.6 | 0.5 |
|  | (C-2) |  |  |  |  |  |
|  | (C-3) |  |  |  |  |  |
|  | (C-4) |  |  |  |  |  |
|  | (C-5) |  |  |  |  |  |
|  | (C-6) |  |  |  |  |  |
|  | (C-7) |  |  |  |  |  |
| Color pigment | Red pigment dispersion (P-1) |  |  |  |  | 0.05 |
| dispersion | Orange pigment dispersion (P-2) |  |  |  |  | 0.78 |
| Rheology control agent | Acrysol ASE-60 |  |  |  |  |  |
| Ultraviolet absorber | Tinuvin 479-DW | 0.14 | 0.14 | 0.156 | 0.156 | 0.156 |
| Light stabilizer | Tinuvin 123-DW | 0.11 | 0.11 | 0.13 | 0.13 | 0.13 |
| Aqueous resin | Aqueous acrylic resin dispersion (R-2) | 0.67 | 0.67 | 0.79 | 0.79 | 0.38 |
| dispersion | U-Coat UX-300 |  |  |  |  |  |
|  | Aqueous polyester resin dispersion (R-3) |  |  |  |  |  |
| Dispersion resin | Hydroxy-containing acrylic resin (R-1) |  |  |  |  | 0.25 |
| Solvent | Isopropanol | 19.5 | 19.5 | 9.79 | 9.79 | 1.66 |
|  | Octanol | 0.51 | 0.51 | 0.59 | 0.59 |  |
| Aqueous effect | Solids content (%) | 3.2 | 4.8 | 4.7 | 4.7 | 3.7 |
| pigment dispersion | B6/mPa · s | 2340 | 2710 | 2670 | 2670 | 2510 |
|  | Viscosity stability | B | B | B | B | B |

| | | Example | | | | | | | |
|---|---|---|---|---|---|---|---|---|---|
| | | 14 | 15 | 16 | 17 | 18 | 19 | 20 | 21 |
| Name of aqueous effect pigment dispersion | | Y-14 | Y-15 | Y-16 | Y-17 | Y-18 | Y-19 | Y-20 | Y-21 |
| Distilled water | | 78.9 | 74.3 | 78 | 76.7 | 76.7 | 76.7 | 76.7 | 76.1 |
| Wetting agent (A) | Dynol 604 | 0.32 | 0.22 | 0.23 | 0.25 | 0.25 | 0.25 | 0.25 | 0.25 |
| | TEGO Twin 4100 | | | | | | | | |
| | BYK-348 | | | | | | | | |
| | Surfynol 420 | | | | | | | | |
| | Surfynol 440 | | | | | | | | |
| | Surfynol 460 | | | | | | | | |
| | Surfynol 104A | | | | | | | | |
| Effect pigment (B) | Hydroshine WS-3001 | 0.59 | 1.4 | 1.0 | 1.2 | 1.2 | 1.2 | 1.2 | 1.1 |
| | Alpaste EMR-B6360 | 0.47 | 0.31 | 0.34 | 0.37 | 0.37 | 0.37 | 0.37 | 0.37 |
| | Metalure Liquid Black | | | | | | | | |
| | Xirallic T61-10 Micro Silver | | | | | | | | |
| | Xirallic T60-10 Crystal Silver | | | | | | | | |
| | Pyrisma M40-58 SW A. Orange | | | | | | | | |
| Cellulose nanofiber (C) | (C-1) | 0.6 | 0.4 | 0.5 | | | | 0.25 | 0.5 |
| | (C-2) | | | | 0.5 | | | | |
| | (C-3) | | | | | 0.5 | | | |
| | (C-4) | | | | | | 0.5 | | |
| | (C-5) | | | | | | | | |
| | (C-6) | | | | | | | | |
| | (C-7) | | | | | | | | |
| Color pigment | Red pigment dispersion (P-1) | | | | 0.46 | | | | |
| dispersion | Orange pigment dispersion (P-2) | | | | | | | | |
| Rheology control agent | Acrysol ASE-60 | | | | | | | 0.25 | |
| Ultraviolet absorber | Tinuvin 479-DW | 0.17 | 0.12 | 0.12 | 0.14 | 0.14 | 0.14 | 0.14 | |
| Light stabilizer | Tinuvin 123-DW | 0.14 | 0.10 | 0.10 | 0.11 | 0.11 | 0.11 | 0.11 | |
| Aqueous resin | Aqueous acrylic resin dispersion (R-2) | 0.87 | 0.58 | 0.44 | 0.67 | 0.67 | 0.67 | 0.67 | 0.93 |
| dispersion | U-Coat UX-300 | | | | | | | | |
| | Aqueous polyester resin dispersion (R-3) | | | | | | | | |
| Dispersion resin | Hydroxy-containing acrylic resin (R-1) | | | | | | | | |
| Solvent | Isopropanol | 17.3 | 22.1 | 18.4 | 19.5 | 19.5 | 19.5 | 19.5 | 20.2 |
| | Octanol | 0.60 | 0.40 | 0.47 | 0.51 | 0.51 | 0.51 | 0.51 | 0.51 |
| | 2-(Dimethylamino)ethanol | | | | | | | 0.09 | |
| Aqueous effect | Solids content (%) | 3.2 | 3.2 | 3.2 | 3.2 | 3.2 | 3.2 | 3.2 | 3.2 |
| pigment dispersion | B6/mPa · s | 2910 | 2050 | 2280 | 2100 | 2600 | 2200 | 2000 | 2360 |
| | Viscosity stability | B | B | B | A | C | B | A | B |

| | | Example | | | | |
|---|---|---|---|---|---|---|
| | | 22 | 23 | 24 | 25 | 26 |
| Name of aqueous effect pigment dispersion | | Y-22 | Y-23 | Y-24 | Y-25 | Y-26 |
| Distilled water | | 76.0 | 75.9 | 75.9 | 92.5 | 51.6 |
| Wetting agent (A) | Dynol 604 | 0.26 | 0.26 | 0.26 | 0.08 | 0.52 |
| | TEGO Twin 4100 | | | | | |
| | BYK-348 | | | | | |
| | Surfynol 420 | | | | | |
| | Surfynol 440 | | | | | |
| | Surfynol 460 | | | | | |
| | Surfynol 104A | | | | | |

TABLE 1-continued (Components other than water and solvents are expressed on a solids basis.)

|  |  |  |  |  |  |  |
|---|---|---|---|---|---|---|
| Effect pigment (B) | Hydroshine WS-3001 | 1.1 | 1.1 | 1.1 | 0.35 | 2.3 |
|  | Alpaste EMR-B6360 | 0.37 | 0.38 | 0.375 | 0.12 | 0.75 |
|  | Metalure Liquid Black |  |  |  |  |  |
|  | Xirallic T61-10 Micro Silver |  |  |  |  |  |
|  | Xirallic T60-10 Crystal Silver |  |  |  |  |  |
|  | Pyrisma M40-58 SW A. Orange |  |  |  |  |  |
| Cellulose nanofiber (C) | (C-1) | 0.5 | 0.5 | 0.5 | 0.3 | 0.5 |
|  | (C-2) |  |  |  |  |  |
|  | (C-3) |  |  |  |  |  |
|  | (C-4) |  |  |  |  |  |
|  | (C-5) |  |  |  |  |  |
|  | (C-6) |  |  |  |  |  |
|  | (C-7) |  |  |  |  |  |
| Color pigment dispersion | Red pigment dispersion (P-1) |  |  |  |  |  |
|  | Orange pigment dispersion (P-2) |  |  |  |  |  |
| Rheology control agent | Acrysol ASE-60 |  |  |  |  |  |
| Ultraviolet absorber | Tinuvin 479-DW | 0.14 | 0.14 | 0.14 | 0.04 | 0.28 |
| Light stabilizer | Tinuvin 123-DW | 0.11 | 0.11 | 0.11 | 0.04 | 0.23 |
| Aqueous resin dispersion | Aqueous acrylic resin dispersion (R-2) |  |  |  | 0.11 | 1.91 |
|  | U-Coat UX-300 |  | 0.69 |  |  |  |
|  | Aqueous polyester resin dispersion (R-3) |  |  | 0.69 |  |  |
| Dispersion resin | Hydroxy-containing acrylic resin (R-1) | 0.69 |  |  |  |  |
| Solvent | Isopropanol | 20.3 | 20.4 | 20.4 | 6.3 | 40.9 |
|  | Octanol | 0.51 | 0.51 | 0.51 | 0.2 | 1.0 |
|  | 2-(Dimethylamino)ethanol |  |  |  |  |  |
| Aqueous effect pigment dispersion | Solids content (%) | 3.2 | 3.2 | 3.2 | 1.0 | 6.5 |
|  | B6/mPa · s | 2510 | 2370 | 2400 | 110 | 3000 |
|  | Viscosity stability | B | B | B | B | B |

|  |  | Example | | Comparative Example | | | | |
|---|---|---|---|---|---|---|---|---|
|  |  | 27 | 28 | 1 | 2 | 3 | 4 | 5 |
| Name of aqueous effect pigment dispersion |  | Y-27 | Y-28 | Y-29 | Y-30 | Y-31 | Y-32 | Y-33 |
| Distilled water |  | 78.5 | 72.8 | 76.7 | 76.2 | 96.8 | 42.3 | 75.8 |
| Wetting agent (A) | Dynol 604 | 0.23 | 0.29 | 0.25 |  | 0.03 | 3.55 | 0.26 |
|  | TEGO Twin 4100 |  |  |  |  |  |  |  |
|  | BYK-348 |  |  |  |  |  |  |  |
|  | Surfynol 420 |  |  |  |  |  |  |  |
|  | Surfynol 440 |  |  |  |  |  |  |  |
|  | Surfynol 460 |  |  |  |  |  |  |  |
|  | Surfynol 104A |  |  |  |  |  |  |  |
| Effect pigment (B) | Hydroshine WS-3001 | 1.0 | 1.27 | 1.2 | 1.1 | 0.01 | 3.9 | 1.1 |
|  | Alpaste EMR-B6360 | 0.34 | 0.42 | 0.37 | 0.37 | 0.01 | 1.3 | 0.38 |
|  | Metalure Liquid Black |  |  |  |  |  |  |  |
|  | Xirallic T61-10 Micro Silver |  |  |  |  |  |  |  |
|  | Xirallic T60-10 Crystal Silver |  |  |  |  |  |  |  |
|  | Pyrisma M40-58 SW A. Orange |  |  |  |  |  |  |  |
| Cellulose nanofiber (C) | (C-1) | 0.4 | 1.2 |  | 0.5 | 0.03 | 0.3 | 0.09 |
|  | (C-2) |  |  |  |  |  |  |  |
|  | (C-3) |  |  |  |  |  |  |  |
|  | (C-4) |  |  |  |  |  |  |  |
|  | (C-5) |  |  |  |  |  |  |  |
|  | (C-6) |  |  |  |  |  |  |  |
|  | (C-7) |  |  |  |  |  |  |  |
| Color pigment dispersion | Red pigment dispersion (P-1) |  |  |  |  |  |  |  |
|  | Orange pigment dispersion (P-2) |  |  |  |  |  |  |  |
| Rheology control agent | Acrysol ASE-60 |  |  |  | 1.0 |  |  |  |
| Ultraviolet absorber | Tinuvin 479-DW | 0.12 | 0.15 | 0.14 | 0.14 |  | 0.47 | 0.14 |
| Light stabilizer | Tinuvin 123-DW | 0.1 | 0.13 | 0.11 | 0.11 |  | 0.39 | 0.11 |
| Aqueous resin dispersion | Aqueous acrylic resin dispersion (R-2) | 0.62 | 0.20 | 0.67 | 0.94 |  | 1.2 | 1.13 |
|  | U-Coat UX-300 |  |  |  |  |  |  |  |
|  | Aqueous polyester resin dispersion (R-3) |  |  |  |  |  |  |  |
| Dispersion resin | Hydroxy-containing acrylic resin (R-1) |  |  |  |  |  |  |  |
| Solvent | Isopropanol | 18.3 | 23 | 19.5 | 20.1 | 3.0 | 46.6 | 20.5 |
|  | Octanol | 0.5 | 0.6 | 0.51 | 0.5 | 0.2 |  | 0.51 |
|  | 2-(Dimethylamino)ethanol |  |  |  | 0.36 |  |  |  |
| Aqueous effect pigment dispersion | Solids content (%) | 2.8 | 3.6 | 3.7 | 3.2 | 0.08 | 11.1 | 3.2 |
|  | B6/mPa · s | 320 | 9050 | 2650 | 2360 | 50 | 1400 | 80 |
|  | Viscosity stability | B | C | A | B | B | B | B |

TABLE 1-continued (Components other than water and solvents are expressed on a solids basis.)

|  |  | Comparative Example | | | | |
|---|---|---|---|---|---|---|
|  |  | 6 | 7 | 8 | 9 | 10 |
| Name of aqueous effect pigment dispersion | | Y-34 | Y-35 | Y-36 | Y-37 | Y-38 |
| | Distilled water | 76 | 89.32 | 76.7 | 76.7 | 76.7 |
| Wetting agent (A) | Dynol 604 | 0.26 | 0.21 | 0.25 | 0.25 | 0.25 |
| | TEGO Twin 4100 | | | | | |
| | BYK-348 | | | | | |
| | Surfynol 420 | | | | | |
| | Surfynol 440 | | | | | |
| | Surfynol 460 | | | | | |
| | Surfynol 104A | | | | | |
| Effect pigment (B) | Hydroshine WS-3001 | 1.1 | | 1.2 | 1.2 | 1.2 |
| | Alpaste EMR-B6360 | 0.38 | | 0.37 | 0.37 | 0.37 |
| | Metalure Liquid Black | | | | | |
| | Xirallic T61-10 Micro Silver | | | | | |
| | Xirallic T60-10 Crystal Silver | | 1.94 | | | |
| | Pyrisma M40-58 SW A. Orange | | | | | |
| Cellulose nanofiber (C) | (C-1) | 1.27 | 1.04 | | | |
| | (C-2) | | | | | |
| | (C-3) | | | | | |
| | (C-4) | | | | | |
| | (C-5) | | | 0.5 | | |
| | (C-6) | | | | 0.5 | |
| | (C-7) | | | | | 0.5 |
| Color pigment dispersion | Red pigment dispersion (P-1) | | | | | |
| | Orange pigment dispersion (P-2) | | | | | |
| Rheology control agent | Acrysol ASE-60 | | | | | |
| Ultraviolet absorber | Tinuvin 479-DW | 0.14 | 0.04 | 0.14 | 0.14 | 0.14 |
| Light stabilizer | Tinuvin 123-DW | 0.11 | 0.03 | 0.11 | 0.11 | 0.11 |
| Aqueous resin dispersion | Aqueous acrylic resin dispersion (R-2) | 0.09 | 0.073 | 0.67 | 0.67 | 0.67 |
| | U-Coat UX-300 | | | | | |
| | Aqueous polyester resin dispersion (R-3) | | | | | |
| Dispersion resin | Hydroxy-containing acrylic resin (R-1) | | | | | |
| Solvent | Isopropanol | 20.1 | 6.93 | 19.5 | 19.5 | 19.5 |
| | Octanol | 0.51 | 0.42 | 0.51 | 0.51 | 0.51 |
| | 2-(Dimethylamino)ethanol | | | | | |
| Aqueous effect pigment dispersion | Solids content (%) | 3.4 | 3.3 | 3.2 | 3.2 | 3.2 |
| | B6/mPa · s | 11000 | 11500 | 3500 | 2650 | 2000 |
| | Viscosity stability | C | B | E | D | A |

Evaluation of Effect Pigment Dispersion

The viscosity stability of each effect pigment dispersion obtained as described above was evaluated by the following method. Table 1 shows the results.

Viscosity Stability of Effect Pigment Dispersion 320 g of the obtained effect pigment dispersion was used. 20 g out of the amount of 320 g was allowed to stand at a temperature of 23° C. for 6 hours, and then the viscosity at a shear rate of 0.1 ($s^{-1}$) was measured at a temperature of 23° C. with a rheometer (RS150, produced by HAAKE) (viscosity before stirring). The remaining 300 g of the effect pigment dispersion was placed in a 500-mL beaker, and the inside of the beaker was vertically stirred to form a uniform state. Thereafter, stirring was performed at a temperature of 23° C. at a rate of 1,000 rpm for 24 hours using a magnetic stirrer. The beaker was hermetically sealed with parafilm to prevent water from evaporating during stirring. After the effect pigment dispersion stirred for 24 hours was allowed to stand at a temperature of 23° C. for 6 hours, the viscosity at a shear rate of 0.1 ($s^{-1}$) was measured at a temperature of 23° C. with a rheometer (RS150 produced by HAAKE) (viscosity after stirring).

Next, the viscosity change (%) at a shear rate of 0.1 ($s^{-1}$) was calculated using the following formula, and the viscosity stability was evaluated according to the following criteria. A, B, or C were regarded as acceptable.

Viscosity change (%) at a shear rate of 0.1 ($s^{-1}$)=
((viscosity before stirring−viscosity after stirring)/viscosity before stirring)×100

A: Viscosity change was less than 30%
B: Viscosity change was 30% or more and less than 40%
C: Viscosity change was 40% or more and less than 60%
D: Viscosity change was 60% or more and less than 70%
E: Viscosity change was 70% or more Preparation of Colored Paint (W)

Colored Paint (W-1) TP-65 Dark Gray (trade name, produced by Kansai Paint Co., Ltd., a polyester resin-based solvent-based intermediate paint, L* value of the obtained coating film: 20) was used as a colored paint (W-1).

Colored Paint (W-2)

TP-65 (trade name, produced by Kansai Paint Co., Ltd., a polyester resin-based solvent-based intermediate paint, L* value of the obtained coating film: 85) was used as a colored paint (W-2).

Colored Paint (W-3)

WP-505T (trade name, produced by Kansai Paint Co., Ltd., a polyester resin-based aqueous intermediate paint, L* value of the obtained coating film: 60) was used as a colored paint (W-3).

Colored Paint (W-4)

Ascalex 2870CD-1 Dark Gray (trade name, produced by Kansai Paint Co., Ltd., an acrylic resin-based aqueous conductive primer paint for PP materials) was used as a colored paint (W-4).

Preparation of Clear Paint (Z)

Clear Paint (Z-1)

KINO6510 (trade name, produced by Kansai Paint Co., Ltd., a hydroxy/isocyanate-curable, acrylic resin/urethane resin-based two-component organic solvent-based paint) was used as a clear paint (Z-1).
Clear Paint (Z-2)
A paint obtained by adding 1.21 parts of Paliogen Maroon L3920 (trade name, produced by BASF, an organic perylene pigment) to 100 parts by mass of the solids content of the resin contained in KIN06510 was used as a clear paint (Z-2).
Clear Paint (Z-3)
Soflex 7175 clear (trade name, produced by Kansai Paint Co., Ltd., a hydroxy/isocyanate-curable, acrylic resin/urethane resin-based two-component organic solvent-based paint for PP materials) was used as a clear paint (Z-3).
Preparation of Substrates
Substrate 1
A steel plate degreased and treated with zinc phosphate (JISG3141, size: 400 mm×300 mm×0.8 mm) was coated with a Elecron GT-10 cationic electrodeposition paint (trade name: produced by Kansai Paint Co., Ltd., an epoxy-resin polyamine-based cationic resin containing a block polyisocyanate compound as a crosslinking agent) by electrodeposition such that the coated film had a film thickness of 20 μm on a cured coating film basis. The coated plate was heated at 170° C. for 20 minutes to be crosslinked and cured to form an electrodeposition coating film, which was used as substrate 1.
Substrate 2
TSOP-1 (TC-6) (trade name, produced by Japan Polychem Corporation, 350 mm×10 mm×2 mm) was prepared as a plastic material. The surface of the plastic material was wiped with gauze impregnated with isopropyl alcohol to degrease the surface, and the degreased plastic material was used as substrate 2.
Production of Test Plates

Example 29

Step (1): The colored paint (W-1) was electrostatically applied to substrate 1 to a cured film thickness of 25 μm using a rotary-atomization bell coater. The substrate thus coated was heated at 140° C. for 30 minutes to be crosslinked and cured, thereby forming a colored coating film.
Step (2): Subsequently, the transparent base paint (X-1) was electrostatically applied to the colored coating film to a cured film thickness of 10 μm using a rotary-atomization bell coater, and allowed to stand for 2 minutes.
Step (3): Further, the effect pigment dispersion (Y-1), adjusted to the coating viscosity as shown in Table 1, was applied to the coating film to a dry film thickness of 1.0 μm at a booth temperature of 23° C. and a humidity of 68% using a Robot Bell (produced by ABB), thereby forming an effect coating film. The substrate thus coated was allowed to stand for 3 minutes, and further allowed to stand at 80° C. for 3 minutes.
Step (4): Subsequently, the clear paint (Z-1) was applied to the obtained dry coating film to a dry film thickness of 35 μm at a booth temperature of 23° C. and a humidity of 68% using a Robot Bell (produced by ABB), thereby forming a clear coating film.
Step (5): After the application, the resulting coated substrate was allowed to stand at room temperature for 7 minutes and then heated in a hot-air circulation drying oven at 140° C. for 30 minutes to simultaneously dry the multilayer coating films, thus forming a test plate.
The dry film thickness of each effect coating film shown in Table 2 was calculated from the formula (3) shown below. The same applies to the following Examples.

$$x=(sc*10000)/(S*sg) \quad (3)$$

x: film thickness (μm)
sc: coating solids content (g)
S: evaluation area of coating solids content (cm$^2$)
sg: specific gravity of the coating film (g/cm$^3$)
Examples 30 to 57 and 59, and Comparative Examples 11 to 20
Test plates were obtained in the same manner as in Example 29 except that the colored paint (W), the transparent base paint (X), the effect pigment dispersion (Y), and the clear paint (Z) shown in Table 2 were used.

Example 58

Step (1): The colored paint (W-3) was electrostatically applied to substrate 1 to a cured film thickness of 25 μm with a rotary-atomization bell coater. The substrate thus coated was allowed to stand for 3 minutes and preheated at 80° C. for 3 minutes, thereby forming a colored coating film.
Step (2): Subsequently, the effect pigment dispersion. (Y-1) prepared as described above was adjusted to the coating viscosity shown in Table 1, and applied to the colored coating film to a dry coating film thickness of 1.0 μm at a booth temperature of 23° C. and a humidity of 68% using a Robot Bell (produced by ABB). The coated substrate was allowed tc stand for 3 minutes and then preheated at 80° C. for 3 minutes, thus forming an effect coating film.
Step (3): Further, the clear paint (Z-1) was applied to the effect coating film to a dry film thickness of 35 μm at a booth temperature of 23° C. and a humidity of 68% using a Robot Bell (produced by ABB), thereby forming a clear coating film.
Step (4): After the application, the resulting coated substrate was allowed to stand at room temperature for 7 minutes and then heated in a hot-air circulation drying oven at 140° C. for 30 minutes to simultaneously dry the multilayer coating films, thus forming a test plate.

Example 60

Step (1): The colored paint (W-4) was electrostatically applied to substrate 2 to a cured film thickness of 10 μm using a rotary-atomization bell coater. The substrate thus coated was allowed to stand for 3 minutes and preheated at 80° C. for 3 minutes, thereby forming a colored coating film.
Step (2): Subsequently, the transparent base paint (X-1) was electrostatically applied to the colored coating film to a cured film thickness of 10 μm using a rotary-atomization bell coater, and allowed to stand for 2 minutes.
Step (3): Further, the effect pigment dispersion (Y-1) was adjusted to the coating viscosity as shown in Table 1 and applied to the coating film to a dry film thickness of 1.0 μm at a booth temperature of 23° C. and a humidity of 68% using a Robot Bell (produced by ABB). The substrate thus coated was allowed to stand for 3 minutes and then preheated at 80° C. for 3 minutes, thereby forming an effect coating film.
Step (4): Further, the clear paint (Z-3) was applied to the obtained effect coating film to a dry film thickness of 35 μm at a booth temperature of 23° C. and a humidity of 68% using a Robot Bell (produced by ABB), thereby forming a clear coating film.
Step (5): After the application, the resulting coated substrate was allowed to stand at room temperature for 7 minutes and then heated in a hot-air circulation drying oven at 120° C. for 30 minutes to simultaneously dry the multilayer coating films, thus forming a test plate.

Example 61

Step (1): The colored paint (W-4) was electrostatically applied to substrate 2 to a cured film thickness of 10 μm using a rotary-atomization bell coater. The substrate thus coated was allowed to stand for 3 minutes, thereby forming a colored coating film.

Step (2): Subsequently, the transparent base paint (X-1) was electrostatically applied to the colored coating film to a cured film thickness of 10 μm using a rotary-atomization bell coater, and allowed to stand for 2 minutes.

Step (3): Further, the effect pigment dispersion (Y-1) was adjusted to the coating viscosity as shown in Table 1 and applied to the coating film to a dry film thickness of 1.0 μm at a booth temperature of 23° C. and a humidity of 68% using a Robot Bell (produced by ABB). The substrate thus coated was allowed to stand for 3 minutes and then preheated at 80° C. for 3 minutes, thereby forming an effect coating film.

Step (4): Further, the clear paint (Z-3) was applied to the effect coating film to a dry film thickness of 35 μm at a booth temperature of 23° C. and a humidity of 68% using a Robot Bell (produced by ABB), thereby forming a clear coating film.

Step (5): After the application, the resulting coated substrate was allowed to stand at room temperature for 7 minutes and then heated in a hot-air circulation drying oven at 120° C. for 30 minutes to simultaneously dry the multilayer coating films, thus forming a test plate.

Example 62

Step (1): The colored paint (W-3) was electrostatically applied to substrate 1 to a cured film thickness of 25 μm using a rotary-atomization bell coater. The substrate thus coated was allowed to stand for 3 minutes and preheated at 80° C. for 3 minutes, thereby forming a colored coating film.

Step (2): Subsequently, the transparent base paint (X-1) was electrostatically applied to the colored coating film to a cured film thickness of 10 μm using a rotary-atomization bell coater, and allowed to stand for 2 minutes.

Step (3): Further, the effect pigment dispersion (Y-1) was adjusted to the coating viscosity as shown in Table 1 and applied to the coating film to a dry film thickness of 1.0 μm at a booth temperature of 23° C. and a humidity of 68% using a Robot Bell (produced by ABB). The substrate thus coated was allowed to stand for 3 minutes and then preheated at 80° C. for 3 minutes, thereby forming an effect coating film.

Step (4): Further, the clear paint (Z-1) was applied to the effect coating film to a dry film thickness of 35 μm at a booth temperature of 23° C. and a humidity of 68% using a Robot Bell (produced by ABB), thereby forming a clear coating film.

Step (5): After the application, the resulting coated substrate was allowed to stand at room temperature for 7 minutes and then heated in a hot-air circulation drying oven at 140° C. for 30 minutes to simultaneously dry the multilayer coating films, thus forming a test plate.

TABLE 2

| | | Example | | | | | | | | | | | | | | |
|---|---|---|---|---|---|---|---|---|---|---|---|---|---|---|---|---|
| | | 29 | 30 | 31 | 32 | 33 | 34 | 35 | 36 | 37 | 38 | 39 | 40 | 41 | 42 | 43 |
| Coating film structure | Substrate | 1 | 1 | 1 | 1 | 1 | 1 | 1 | 1 | 1 | 1 | 1 | 1 | 1 | 1 | 1 |
| | Colored paint | W-1 | W-1 | W-1 | W-1 | W-1 | W-1 | W-1 | W-1 | W-1 | W-1 | W-2 | W-2 | W-2 | W-1 | W-1 |
| | Transparent base paint | X-1 | X-1 | X-1 | X-1 | X-1 | X-1 | X-1 | X-1 | X-1 | X-1 | X-1 | X-1 | X-1 | X-1 | X-1 |
| | Effect pigment dispersion | Y-1 | Y-2 | Y-3 | Y-4 | Y-5 | Y-6 | Y-7 | Y-8 | Y-9 | Y-10 | Y-11 | Y-12 | Y-13 | Y-14 | Y-15 |
| | Clear paint | Z-1 | Z-1 | Z-1 | Z-1 | Z-1 | Z-1 | Z-1 | Z-1 | Z-1 | Z-1 | Z-1 | Z-1 | Z-1 | Z-1 | Z-1 |
| Coating film appearance | 60 degree | 146 | 145 | 147 | 146 | 161 | 140 | 141 | 153 | 130 | 114 | 109 | 115 | 92 | 145 | 144 |
| | Graininess | 43.7 | 43.2 | 43.9 | 45.3 | 33.7 | 45.8 | 47.3 | 32 | 50 | 17.5 | 50 | 60 | 41.9 | 40 | 50 |
| Coating film performance | Waterproof adhesion | A | A | A | A | A | A | A | A | A | A | A | A | A | A | A |
| | Waterproof adhesion after long-term accelerated weathering test | A | B | B | A | A | A | A | A | A | A | A | A | A | A | B |

| | | Example | | | | | | | | | | | | | | |
|---|---|---|---|---|---|---|---|---|---|---|---|---|---|---|---|---|
| | | 44 | 45 | 46 | 47 | 48 | 49 | 50 | 51 | 52 | 53 | 54 | 55 | 56 | 57 | 58 |
| Coating film structure | Substrate | 1 | 1 | 1 | 1 | 1 | 1 | 1 | 1 | 1 | 1 | 1 | 1 | 1 | 1 | 1 |
| | Colored paint | W-1 | W-1 | W-1 | W-1 | W-1 | W-1 | W-1 | W-1 | W-1 | W-1 | W-1 | W-1 | W-1 | W-1 | W-3 |
| | Transparent base paint | X-1 | X-1 | X-1 | X-1 | X-1 | X-1 | X-1 | X-1 | X-1 | X-1 | X-1 | X-1 | X-1 | X-2 | None |
| | Effect pigment dispersion | Y-16 | Y-17 | Y-18 | Y-19 | Y-20 | Y-21 | Y-22 | Y-23 | Y-24 | Y-25 | Y-26 | Y-27 | Y-28 | Y-12 | Y-1 |
| | Clear paint | Z-1 | Z-1 | Z-1 | Z-1 | Z-1 | Z-1 | Z-1 | Z-1 | Z-1 | Z-1 | Z-1 | Z-1 | Z-1 | Z-1 | Z-1 |
| Coating film appearance | 60 degree | 140 | 140 | 148 | 141 | 142 | 148 | 141 | 147 | 145 | 153 | 135 | 144 | 135 | 109 | 135 |
| | Graininess | 38 | 45.1 | 41.7 | 44.1 | 41.2 | 41.2 | 46 | 43.5 | 44.1 | 35 | 47 | 46 | 52 | 60 | 40 |
| Coating film performance | Waterproof adhesion | A | A | A | A | A | A | A | A | A | A | A | A | A | A | A |
| | Waterproof adhesion after long-term accelerated weathering test | B | A | B | A | A | B | A | A | A | A | A | A | B | A | A |

TABLE 2-continued

|  |  | Example | | | | Comparative Example | | | | | | | | | |
| --- | --- | --- | --- | --- | --- | --- | --- | --- | --- | --- | --- | --- | --- | --- |
|  |  | 59 | 60 | 61 | 62 | 11 | 12 | 13 | 14 | 15 | 16 | 17 | 18 | 19 | 20 |
| Coating film structure | Substrate | 1 | 2 | 2 | 1 | 1 | 1 | 1 | 1 | 1 | 1 | 1 | 1 | 1 | 1 |
|  | Colored paint | W-1 | W-4 | W-4 | W-3 | W-1 | W-1 | W-1 | W-1 | W-1 | W-1 | W-2 | W-1 | W-1 | W-1 |
|  | Transparent base paint | X-1 | X-1 | X-1 | X-1 | X-1 | X-1 | X-1 | X-1 | X-1 | X-1 | X-1 | X-1 | X-1 | X-1 |
|  | Effect pigment dispersion | Y-1 | Y-1 | Y-1 | Y-1 | Y-29 | Y-30 | Y-31 | Y-32 | Y-33 | Y-34 | Y-35 | Y-36 | Y-37 | Y-38 |
|  | Clear paint | Z-2 | Z-3 | Z-3 | Z-1 | Z-1 | Z-1 | Z-1 | Z-1 | Z-1 | Z-1 | Z-1 | Z-1 | Z-1 | Z-1 |
| Coating film appearance | 60 degree | 91 | 144 | 141 | 133 | 136 | 125 | 117 | 130 | 116 | 120 | 113 | 153 | 150 | 128 |
|  | Graininess | 38.1 | 47 | 48.5 | 45.6 | 56 | 58 | 25 | 57 | 24 | 60 | 70 | 38.0 | 40.2 | 57.0 |
| Coating film performance | Waterproof adhesion | A | A | A | A | A | A | Not measurable (Sagging) | A | Not measurable (Sagging) | B | A | C | B | A |
|  | Waterproof adhesion after long-term accelerated weathering test | B | B | B | A | A | A | Not measurable (Sagging) | A | Not measurable (Sagging) | B | A | C | C | A |

Evaluation of Coating Film

The appearance and performance of the coating films of the test plates obtained as described above were evaluated. Table 2 show the results. The appearance of each coating film was evaluated in terms of specular gloss and graininess. The coating film performance was evaluated in terms of waterproof adhesion, and waterproof adhesion after a long-term accelerated weathering test.

60-Degree Specular Gloss (60 Degree)

The 60 degree value of the test plates obtained above was measured using a glossmeter (micro-TRI-gloss, produced by BYK-Gardner). The higher the value, the better.

Graininess

The graininess was evaluated as a hi-light graininess value (hereinafter abbreviated as the "HG value"). The HG value is a parameter of microscopic brilliance obtained by microscopic observation of a coating surface, and indicates the graininess in the highlight. The HG value is calculated as follows. The coating surface is first photographed with a CCD camera at a light incidence angle of 15° and a receiving angle of 0°, and the obtained digital image data (two-dimensional brilliance distribution data) is subjected to a two-dimensional Fourier transform to obtain a power spectrum image. Subsequently, only the spatial frequency area corresponding to graininess is extracted from the power spectrum image, and the obtained measurement parameter is converted to an HG value from 0 to 100 that has a linear relation with graininess. An HG value of 0 indicates no graininess of the effect pigment at all, whereas an HG value of 100 indicates the highest possible graininess of the effect pigment.

When a vapor deposition metal flake pigment and/or an aluminum flake pigment is used as a flake-effect pigment (B), an HG value of 55 or less is regarded as acceptable. When an interference pigment is used as a flake-effect pigment (B), an HG value of 65 or less is regarded as acceptable.

Waterproof Adhesion

The test plates were immersed in warm water at 40° C. for 240 hours, and then drawn out. Water droplets and dirt were wiped away with a cloth. Cross-cuts that reached the substrate of each test plate were then made to form a grid of 100 squares (2 mm×2 mm) on the multilayer coating film of the plate with a utility knife at room temperature of 23° C. within 10 minutes. Subsequently, an adhesive cellophane tape was applied to the surface of the grid portion, and then abruptly peeled off. The remaining condition of the grid of the coating film was examined, and water resistance was evaluated in accordance with the following criteria. A and B were regarded as acceptable, and C was regarded as unacceptable.

A: 100 squares of the grid of the coating film remained, and no slight edge-peeling occurred at the edge of cuts made by the knife.

B: 100 squares of the grid of the coating film remained, but slight edge-peeling occurred at the edge of cuts made by the knife.

C: The number of remaining squares of the grid of the coating film was 99 or less.

Waterproof Adhesion After Long-Term Accelerated Weathering Test

A long-term accelerated weathering test was performed using the Super Xenon Weather Meter (trade name, Suga Test Instruments Co., Ltd.) specified in JIS B 7754. More specifically, the test plates were irradiated with a xenon arc lamp for 1 hour and 42 minutes, and then exposed to rainfall for 18 minutes. This 2-hour session comprising irradiation with the lamp was defined as 1 cycle. This cycle was repeated for 4000 hours, after which the same procedures as in the waterproof adhesion test described above were performed. A and B were regarded as acceptable, and C was regarded as unacceptable.

A smaller difference between the results of the waterproof adhesion test and the results of the waterproof adhesion test after the long-term accelerated weathering test was considered to represent higher stability of the effect pigment dispersion.

Table 2 shows that the multilayer coating films of Examples 1 to 62 had excellent 60-degree specular gloss and acceptable graininess, and had both acceptable waterproof adhesion and acceptable waterproof adhesion after the long-term accelerated weathering test.

In contrast, in terms of the multilayer coating films of Comparative Examples 13 and 15, normal coating films were not formed due to paint-sagging during the application; therefore, these coating films could not be subjected to the evaluation test for coating film performance. The multilayer coating film of Comparative Example 19 had unacceptable waterproof adhesion after the long-term accelerated weathering test. The multilayer coating film of Comparative Example 18 had both unacceptable waterproof adhesion and unacceptable waterproof adhesion after the long-term accelerated weathering test. The multilayer coating films of Comparative Examples 11, 12, 14, 16, 17, and 20 had unacceptable graininess.

The embodiments of the present invention and Examples thereof are specifically described above. However, the present invention is not limited to the above embodiments. Various modifications can be made based on the technical idea of the present invention.

The invention claimed is:

1. An effect pigment dispersion comprising
water,
a wetting agent (A),
a flake-effect pigment (B), and
cellulose nanofibers (C),
the cellulose nanofibers (C) having a carboxyl group amount of 0.4 to 1.0 mmol/g based on the absolute dry mass of the cellulose nanofibers and having a transparency of 80% or more in a 1.0 mass % aqueous dispersion of the cellulose nanofibers,
the effect pigment dispersion having a solids content of 0.1 to 10 parts by mass, per 100 parts by mass of all of the components of the effect pigment dispersion,
the effect pigment dispersion having a viscosity of 100 to 10000 mPa·sec as measured with a Brookfield viscometer at a rotational speed of 6 revolutions per minute.

2. The effect pigment dispersion according to claim 1, wherein the wetting agent (A) is present, on a solids basis, in an amount of 4 to 400 parts by mass, per 100 parts by mass of the solids content of the flake-effect pigment (B).

3. The effect pigment dispersion according to claim 1, wherein the flake-effect pigment (B) is present, on a solids basis, in an amount of 2 to 97 parts by mass, per 100 parts by mass of the solids content of the effect pigment dispersion.

4. The effect pigment dispersion according to claim 1, further comprising an aqueous resin dispersion.

5. A method for forming a multilayer coating film, comprising
applying a colored paint to a substrate to form a colored coating film,
applying the effect pigment dispersion of claim 1 to the formed colored coating film to form an effect coating film, and
applying a clear paint to the formed effect coating film to form a clear coating film.

6. The method for forming a multilayer coating film according to claim 5, wherein the effect coating film has a thickness of 0.1 to 4 μm on a dry film basis.

7. The method for forming a multilayer coating film according to claim 5, wherein the multilayer coating film has a 60-degree specular gloss of 90 to 240.

8. A multilayer coating film comprising
a colored coating film formed from a colored paint,
an effect coating film that is formed from the effect pigment dispersion of claim 1 and that is formed on the colored coating film, and
a clear coating film that is formed from a clear paint and that is formed on the effect coating film.

9. The multilayer coating film according to claim 8, wherein the effect coating film has a thickness of 0.1 to 4 μm on a dry film basis.

10. The multilayer coating film according claim 8, which has a 60-degree specular gloss of 90 to 240.

* * * * *